(12) United States Patent
Lea

(10) Patent No.: US 6,349,352 B1
(45) Date of Patent: *Feb. 19, 2002

(54) HOME AUDIO/VIDEO NETWORK WITH BOTH GENERIC AND PARAMETERIZED DEVICE CONTROL

(75) Inventor: Rodger J. Lea, San Jose, CA (US)

(73) Assignees: Sony Corporation of Japan, Tokyo (JP); Sony Electronics, Inc., Park Ridge, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/003,097

(22) Filed: Jan. 6, 1998

(51) Int. Cl.[7] ................................................. G06F 9/06
(52) U.S. Cl. .............................. 710/72; 710/10; 707/1; 707/301; 707/305
(58) Field of Search ........................ 710/10, 72; 707/1, 707/301, 305

(56) References Cited

U.S. PATENT DOCUMENTS

| | | | | |
|---|---|---|---|---|
| 4,893,199 A | | 1/1990 | Okada ........................... | 360/48 |
| 5,394,541 A | * | 2/1995 | Chesley et al. .............. | 711/167 |
| 5,420,573 A | | 5/1995 | Tanaka et al. .......... | 340/825.24 |
| 5,537,605 A | | 7/1996 | Teece ........................... | 395/800 |
| 5,657,414 A | * | 8/1997 | Lett et al. ...................... | 386/35 |
| 5,936,667 A | * | 8/1999 | Saib et al. ................... | 348/180 |
| 6,052,750 A | * | 4/2000 | Lea .............................. | 710/72 |

FOREIGN PATENT DOCUMENTS

| | | | | |
|---|---|---|---|---|
| JP | 2767795 | 3/1989 | ............. | H04L/5/22 |

OTHER PUBLICATIONS

Child, J. "Intelligent home technology looks for leverage from related markets." *Computer Design*, Dec. 1997, pp. 85–87. XP–000754856.

Evans, G. "CEBus Defining the future of residential communications." *Australian Electronics Engineering*, Mar. 1997, pp. 34–38. XP–002105591.

Markwater, B. et al. "Design Techniques For Plug–and–Play in 'Smart Homes' And Consumer Products." *Electronics Design*, Aug. 18, 1997, pp. 64–66, 68. XP–002105592.

* cited by examiner

Primary Examiner—Thomas Lee
Assistant Examiner—Tammara Peyton
(74) Attorney, Agent, or Firm—Wagner Murabito & Hao LLP

(57) ABSTRACT

A method and system for providing basic command functionality and expanded command functionality between a plurality of devices in a network. When a first device is coupled to a home audio video network which includes a second device, a generic control module for the first device is generated by the second device. The generic control module is a basic abstraction of the capabilities of the first device. The generic control module enables the first device to respond to a basic set of commands from the second device. The second device then uses the generic control module to obtain descriptive information from the first device. The descriptive information describes the capabilities of the first device. The second device then generates a parameterized control module for the first device by modifying the generic control module based upon the descriptive information. The second device is then able to access the first device via the parameterized control module. The parameterized control module enables the first device to respond to an expanded set of commands from the second device.

22 Claims, 17 Drawing Sheets

HOME AUDIO/VIDEO NETWORK WITH BOTH GENERIC AND PARAMETERIZED DEVICE CONTROL

FIELD OF THE INVENTION

The field of the present invention pertains to audio-video systems. More particularly, the present invention pertains to a the networking of a number of electronic devices to form an audio video system.

BACKGROUND OF THE INVENTION

A typical home audiovisual equipment set up includes a number of components. For example, a radio receiver, a CD player, a pair of speakers, a television, a VCR, a tape deck, and alike. Each of these components are connected to each other via a set of wires. One component is usually the central component of the home audiovisual system. This is usually the radio receiver, or the tuner. The tuner has a number of specific inputs for coupling the other components. The tuner has a corresponding number of control buttons or control switches which provide a limited degree of controllability and interoperability for the components. The control buttons and control switches are usually located on the front of the tuner. In many cases, some, or all, of these buttons and switches are duplicated on a hand held remote control unit. A user controls the home audiovisual system by manipulating the buttons and switches on the front of the tuner, or alternatively, manipulating buttons on the hand held remote control unit.

This conventional home audiovisual system paradigm has become quite popular. As consumer electronic devices become more capable and more complex, the demand for the latest and most capable devices has increased. As new devices emerge and become popular, the devices are purchased by consumers and "plugged" into their home audiovisual systems. Generally, the latest and most sophisticated of these devices are quite expensive (e.g., digital audio tape recorders, DVD players, digital camcorders, and alike). As a consumer purchases new devices, most often, the new device is simply plugged into the system alongside the pre-existing, older devices (e.g., cassette tape deck, CD player, and the like).

The new device is plugged into an open input on the back of the tuner, or some other device couple to the tuner. The consumer (e.g., the user) controls the new device via the control buttons on the tuner, via the control buttons and control switches on the front of the new device itself, or via an entirely new, separate, respective remote control unit for the new device.

As the number of new consumer electronics devices for the home audiovisual system have grown and as the sophistication and capabilities of these devices have increased, a number of problems with the conventional paradigm have emerged. One such problem is incompatibility between devices in the home audiovisual system. Consumer electronic devices from one manufacturer often couple to an audiovisual system in a different manner than similar devices from another manufacturer. For example, a tuner made by one manufacturer may not properly couple with a television made by another manufacturer.

In addition, were one device is much newer than another device additional incompatibilities may exist. For example, a new device might incorporate hardware (e.g., specific inputs and outputs) which enables more sophisticated remote control functions. This hardware may be unusable with older devices within the system. Or, for example, older tuners may lack suitable inputs for some newer devices (e.g., mini-disc players, VCRs, etc.), or may lack enough inputs for all devices of the system.

Another problem is the lack of functional support for differing devices within an audiovisual system. For example, even though a television may support advanced sound formats (e.g., surround sound, stereo, etc.), if an older less capable tuner does not support such functionality, the benefits of the advanced sound formats can be lost.

Another problem is the proliferation of controls for the new and differing devices within the home audiovisual system. For example, similar devices from different manufacturers can each have different control buttons and control switch formats for accomplishing similar tasks (e.g., setting the clock on a VCR, programming a VCR record a later program, and alike). In addition, each new device coupled to the audiovisual system often leads to another dedicated remote control unit for the user to keep track of and learn to operate.

While the emergence of networking and interface technology (e.g., IEEE 1394 serial communication bus and the wide spread adoption of digital systems) offers prospects for correcting these problems, there is still no coherent, open, extensible architecture which can provide for intelligent, self configuring, easily extensible devices or AV systems. For example, while various solutions involving the use of IEEE 1394 as the basis of an AV system, none provide for the extensibility of the AV system over its life time, as new devices are added whose capabilities and features are unknown. None of these systems guarantee that all devices can be communicated with and controlled and enjoyed by the user.

SUMMARY OF THE INVENTION

Accordingly, what required is a new architecture for a home audiovisual system which corrects the interoperability and functionality problems of the conventional system. What is required is a new architecture for an open, interoperating, audiovisual system for devices within a home network. What is required is an architecture which allows devices from any manufacturer to function seamlessly with a home audiovisual system. What is required is an architecture which is extensible, and can be readily modified and advanced as market requirements and technology change.

The present invention provides a home audio visual (AV) network which defines an open architecture for inter-operating CE (consumer electronic) devices in a home network. The interoperability aspects of the present invention define an architectural model that allows CE devices from any manufacturer to inter-operate and function seamlessly within the user's home AV system. The system of the present invention includes a combination of a base set of generic device controls with an method to extend a base control protocol as new features and new CE devices are deployed within the home AV network. In so doing, the architecture of the present invention is extensible, and can be readily modified and advanced as market requirements and technology change.

To implement the above features, the present invention includes an architecture that allows the newly coupled device to be queried. Using the results of the query, a software based abstraction of that device is generated and made available to other elements in the network. The software abstraction is referred to as a device control module. The device control module provides a predefined, standardized, set of interoperability, functionality, and control interfaces for the device. The CE device is coupled to and communicates with the home AV network via a device control module. Each CE device in the home AV system has a corresponding device control module (DCM). The DCM of the present invention also provides an application programming interface (API) to allow other applications to access and manipulate any newly coupled CE device.

Through the DCMs of the present invention, over the life time of the AV system, as new devices are added whose capabilities and features are unknown, or only partially known to other devices, a mechanism is provided which guarantees that all devices can be communicated with and controlled at some basic minimal level, and then where possible, as more information is obtained about the device, a better abstraction of the new device is created.

Specifically, in one embodiment of the present invention, the level 1 generic DCM is used to provide a basic abstraction for a devices's functionality and capabilities based on the generic class of the device. The present invention then uses information held in the device itself to paramaterize and specialize the level 1 generic DCM so that a better abstraction of the device is made available. To do this, the system uses the level 1 generic DCM as an access point to queries the device further. Any resulting information that the device makes available is then be used to modify and parameterize the level 1 generic DCM. This enables the device to provide extra commands that the device responds to that are beyond the basic set of commands for a device of its class, extra information about how the device should be presented to the user via a user interface, and miscellaneous information that can be used to augment the device abstraction and associated application program interface (API). In so doing, the present invention provides an extremely flexible mechanism that ensures that new devices are efficiently integrated into the home AV system.

BRIEF DESCRIPTION OF THE DRAWINGS

The present invention is illustrated by way of example and not by way of limitation, in the figures of the accompanying drawings and in which like reference numerals refer to similar elements and in which.

DETAILED DESCRIPTION OF THE INVENTION

Reference will now be made in detail to the embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

The present invention provides a home AV network which defines an open architecture for inter-operating CE devices in a home network. The interoperability aspects of the present invention define an architectural model that allows CE devices from any manufacturer to inter-operate and function seamlessly within the user's home AV system. The system of the present invention includes a combination of a base set of generic device controls with an method to extend a base control protocol as new features and new CE devices are deployed within the home AV network. In so doing, the architecture of the present invention is extensible, and can be readily modified and advanced as market requirements and technology change. The present invention and its benefits are further described below.

NOTATION AND NOMENCLATURE

Figure 2:
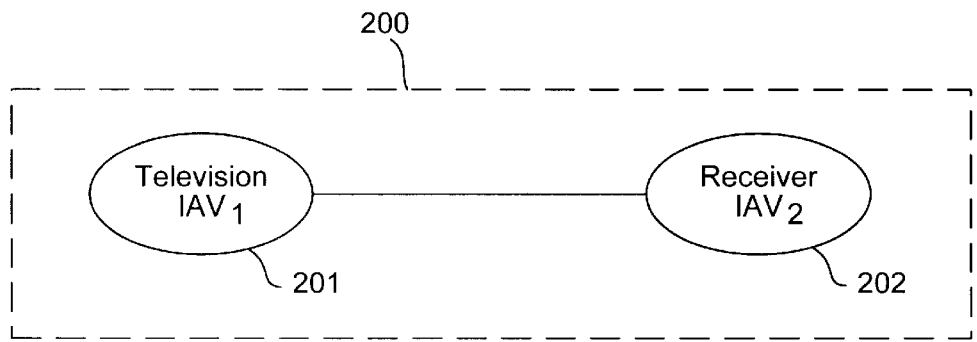
FIG. 2, shows an exemplary peer to peer, two IAV (intermediate audio video) node network in accordance with one embodiment of the present invention.

Some portions of the detailed descriptions which follow are presented in terms of procedures, steps, logic blocks, processing, and other symbolic representations of operations on data bits within a computer memory (see FIG. 2). These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "computing" or "translating" or "instantiating" or "determining" or "displaying" or "recognizing" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

ARCHITECTURE OVERVIEW

The Architecture of the present invention enables the creation of a Home AV system which provides for seamless support of new devices and problem free interoperability of devices in a home AV network. The most basic components of a system in accordance with the present invention are: a home AV interoperability architecture, a series of home AV interoperability interfaces, and a home AV network. The home AV interoperability architecture is a broad, over arching term encompassing the physical network and the controlling programming interfaces. Interoperability interfaces is a term used to describe the interactions and interfaces of the components of the AV architecture. In addition to providing a common command set, the interoperability interfaces provide a software architecture which allows new devices to be integrated into the network and provide their services in a seamless manner. The home AV network is the term used to describe the physical network and its topology.

It should be noted that the home AV interoperability (HAVI) architecture of the present invention is an open, platform-independent, architecturally-neutral network that allows consumer electronics manufacturers and producers to provide inter-operable appliances. It can be implemented on different hardware/software platforms and does not include features that are unique to any one platform. The interoperability interfaces of the HAVI architecture are extensible and can be added to, modified and advanced as market requirements and technology change. They provide the infrastructure to control the routing and processing of isochronous and time-sensitive data (e.g., such as audio and video content).

Specifically, the HAVI architecture provides: an execution environment supporting the visual representation and control of appliances; application and system services; and communication mechanisms for extending the environment dynamically through plug and play or otherwise.

It should be noted that the HAVI architecture supports legacy appliances (e.g., appliances that already exist and are available to users). This is important since the transition to more intelligent networked appliances is going to be slow. Most manufacturers will not suddenly begin producing only "intelligent" appliances and most consumers will not quickly begin replacing all of their existing appliances.

In accordance with the present invention, there are two classes of legacy appliances. A first class includes "one-way" or unacknowledged control appliances. A second class includes controllable "two-way" appliances. Examples of one-way appliances are audio/video components controlled by infrared commands of a hand held remote. Two-way appliances provide confirmation of command execution, status and error reporting. Examples of two-way appliances include the recent introduction of well known IEEE 1394 enabled digital cameras.

It should be noted that the home AV network (hereafter HAVI network) of the present invention provides support to accommodate future appliances and protocols through a write-once, run-everywhere common language. In accordance with the present invention, each appliance includes within it self-describing information concerning the user interface and the device control that can be used by an external controller. This information is specified as programs in the common language.

As described below, the underlying structure for such a network consists of set of interconnected clusters of appliances. Typically, there will be several clusters in the home, with one per floor, or per room. Each cluster will work as a set of interconnected devices to provide a set of services to users. Often, one device will act as a controller for a set of other devices. However, the architecture is sufficiently flexible to also allow a home to consist of a single cluster with no master controller.

For example, in one embodiment of the present invention, an intelligent television in the family room of a user's home might function as the controller for a number of interconnected appliances. Each of the controlled appliances would have self describing data and possibly some associated control code. When these appliances are first connected, the controller obtains the user interface and the control program for the appliance. An icon representing the appliance may then appear on the television screen, and manipulating the icon may cause elements of the control program to actuate the represented appliance or appliances in prescribed ways. The exception to this model are legacy devices which will have neither self describing data or control code. For addition descriptions and related art regarding self describing data, the reader is referred to Ludtke, et al., A METHOD AND APPARATUS FOR INCLUDING SELF-DESCRIBING INFORMATION WITHIN DEVICES, provisional application number 60/054,327, filed on Jul. 31, 1997, which is incorporated herein by reference.

It should be noted that the HAVI network of the present invention supports "Plug and Play" consumer appliances are easy to install, and provide a significant portion of their value to the consumer without any action on the user's part, beyond physically connecting the cables. This is in distinction to existing appliances that require configuration to provide some major portion of their functionality. The goal is to offer 'hot' plug and play (not requiring the user to switch off appliances) where the connection method supports it safely and reliably.

In accordance with the present invention, an appliance configures itself, and integrates into a system-wide "look and feel" user interface, without user intervention. Low-level communication services provide notification when a new appliance is identified on the AV network. While there will often be settings the user may change to suit his or her preferences, the appliance does not require the user to do so in order to offer basic functionality.

It should also be noted that the HAVI network of the present invention is flexible and supports multiple user interfaces, adapting to both the user's needs and the manufacturers need for brand differentiation. In the AV network, protocols scale gracefully from very resource-rich, intelligent PC-like appliances to "dumb", resource starved appliances (e.g., a coffee maker or thermostat). To achieve this, the AV architecture allows low-end appliances to use the resources of more intelligent appliances in well-defined ways. In a similar manner, the AV architecture allows the specification of aggregate appliances where an abstract appliance is created from a logical collection of several lower-level appliances.

And additionally, it should be noted that the HAVI network of the present invention supports existing standards. The HAVI network is complementary to several existing, well known, industry standards and technologies including: CEBus; Home Plug and Play; EHSI; VESA; Home Network, DAVIC, CoMMeND, Lonworks, USB, IEEE 1394, etc. Accordingly, one goal of the present invention is to provide an infrastructure into which existing devices can fit.

THE SYSTEM MODEL OF THE HAVI ARCHITECTURE

Figure 1A:
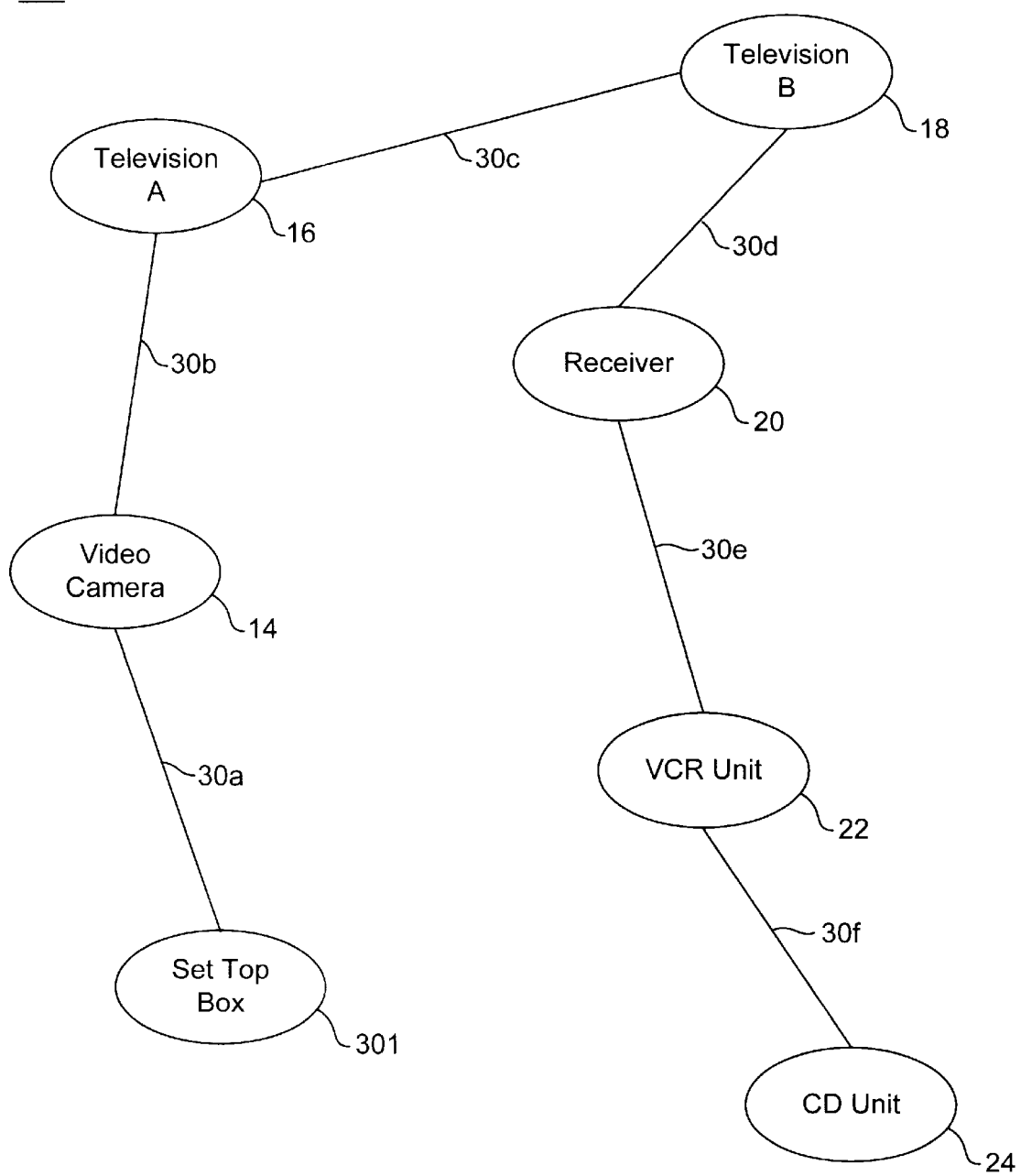
FIG. 1A shows a home AV network in accordance with one embodiment of the present invention.

With reference now to FIG. 1A, a HAVI network 10a in accordance with one embodiment of the present invention is shown. As described above, the HAVI architecture supports a wide range of devices including intelligent receiver/decoders (IRDs), for example, the set top box 301, digital video tape records (DVTRs), video cassette recorders (VCRs), personal computers (PCs), digital video disk players (DVDs), etc., communicating to-port connecting configuration 10a of an exemplary HAVI network. CE devices ("devices") 12–24 are shown connected together with bus segments 30a–30f. In one embodiment of HAVI, the IEEE 1394 serial communication bus standard is used as a platform to provide the common messaging system.

Figure 1B:
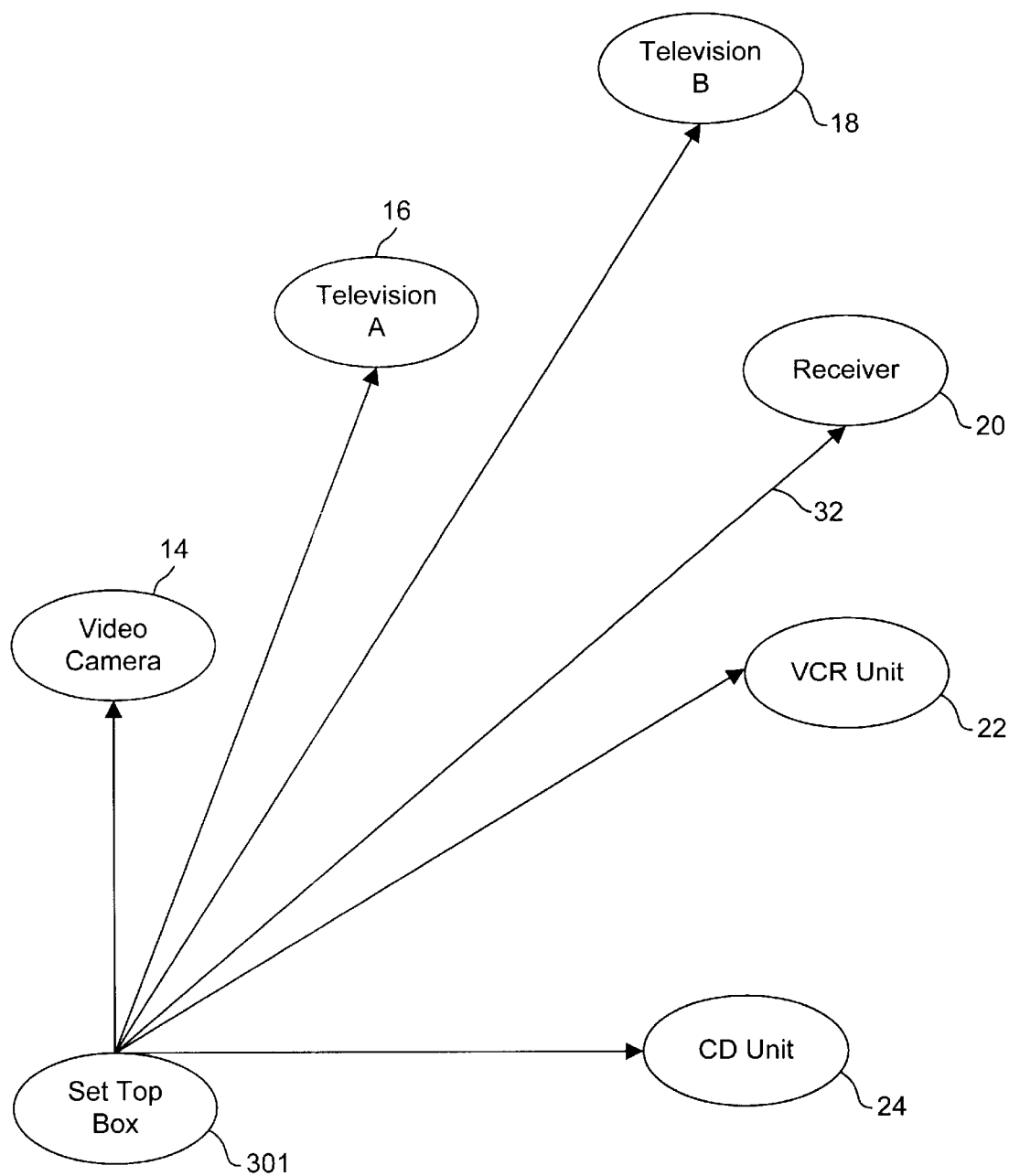
FIG. 1B illustrates a logical bus configuration of the HAVI network of FIG. 1A.

FIG. 1B illustrates a logical bus configuration 10b of the HAVI network of FIG. 1A. As shown in FIG. 1B, all of the devices 12–24 of the HAVI network can be viewed as logically coupled to a common IEEE 1394 serial communication bus 30. Within this bus configuration 10b, peer-to-peer device communication is supported. For example, as shown in FIG. 1C, any device (having appropriate capabilities), e.g., device 12, can send or receive communication packets from any other device in the HAVI network. In the example of FIG. 1B, the set-top-box (e.g., an IRD) can receive messages from or generate messages to any of the other devices 14–24 of the HAVI network.

Referring still to FIGS. 1A and 1B, as described above, the interoperability model in HAVI provides for the following: 1) support for existing devices; 2) a default control model; 3) a means to extend the default control model when new devices or functionality is brought to market; and 4) a common means for device representation (e.g., graphics user interfaces). To achieve the above, the HAVI architecture defines three types of nodes in the home network: Full AV nodes (FAV), Intermediate AV nodes (IAV) and Base AV nodes (BAV).

A Full AV node is a device that contains a complete instance of the AV software model (described in detail below). This type of node generally has a richer set of resources and is capable of supporting a complex software environment. The primary distinguishing feature of a FAV is that it is able to take control responsibility for less sophisticated devices and does this by loading a control module, usually from the less sophisticated device, and executing it locally. Examples of such nodes would be Set Top Boxes (e.g., set top box 301), Smart TV's, general purpose home control devices, or even Home PC's.

Intermediate AV nodes are generally lower cost devices that have limited resources. They do not provide an execution environment for control modules and so can not act as master controllers within the home network. Because they have limited resources, they can access remote resources in one of two ways: by working with other IAV devices who provide some capability they lack, or by using an FAV node which supports a control module to control them. In this second mode of operation they rely on full AV nodes to provide such facilities as a display device, general purpose compute resources and some overall control framework. This allows Full AV devices to bind a variety of intermediate AV devices together to provide a service or abstraction to the user.

Base nodes are nodes that are neither FAV or IAV nodes. These are two generic types: Legacy base nodes, and other base nodes. Legacy base nodes are devices that were built before the advent of the HAVI architecture. These devices often use proprietary protocols for their control, and quite frequently have a simple, well defined, control only protocol. Such devices can work in the HAVI network but require that a Full AV node act as a gateway. Communication between a Full or Intermediate AV node and legacy devices requires that the Home AV commands used in the HAVI architecture be translated to and from the legacy command protocol. Other base nodes are devices that, for business or resource reasons, choose to implement future proof behavior using uploadable control software and do not carry any of the HAVI architecture or the message communication system. These devices will be controlled by an FAV node with a private command protocol between FAV and BAV node.

With the exception of legacy nodes, each node has, as a minimum, enough functionality to allow it to communicate with other nodes in the system. During the course of interaction, nodes exchange control and data information to enable devices to inter-operate and will do so in a peer to peer fashion. This ensures that, at the communication level, no one device is required to act as a master or controller for the system. However, it also allows a logical master or controller to impose a control structure on the basic peer to peer communication model. Services in the HAVI network are provided by one or more nodes communicating amongst themselves to deliver a service to user or an application. Where it is necessary for a node to interact with a user, then the node negotiates with other nodes to access and use a display device.

Additionally, it should be appreciated that a distinction is made between Logical and Physical nodes. A good example of this distinction can be found in a normal TV set. Although the TV set is generally one physical box, it contains several functional components, e.g. the tuner, audio output etc. From the system point of view a physical node is an addressable peer node in the system. If the TV is constructed in such a way that its individual functional components are individually addressable, then it is logically one node and physically several nodes. Conversely, if it is constructed to have one addressable entity, then it is both a single logical node and a single physical node.

The IAV devices and FAV devices communicate by sending messages over the home network using a generic message passing system. When new devices join the home network, they are recognized and added to a global name database (registry). The registry holds information about their characteristics and provides a reference to a handler for that device. Other devices and services are able to query the registry to locate a device and then using the handler, can interact with the device. For additional descriptions and related art regarding the communication and identification processes of the present invention, the reader is referred to Ogino, et al., "METHOD AND SYSTEM FOR PROVIDING A DEVICE IDENTIFICATION MECHANISM WITHIN A CONSUMER AUDIO/VIDEO NETWORK", a U.S. patent application filed on Jan. 6, 1998, which is incorporated herein by reference.

When a device is initially added to the home network, the system queries the device to ascertain its characteristics and capabilities. Once a device's characteristics are known, the architecture provides two methods of controlling it. The first method, level 1 interoperability uses a predefined message set. All IAV and FAV nodes can use this command set to access and control other devices (BAV nodes, because they are deployed before the architecture was defined, are controlled using legacy protocols). The provides a default level of control. The FAV nodes act as control nodes and create a local representation of the IAV node, known as a device control module (DCM) that provides an API used to send control commands to the device.

Level 2 interoperability within HAVI goes farther and supports future added functionality and new devices. To achieve this, a particular device can carry within its ROM, an override DCM that is uploaded from the IAV device, to the FAV device and replaces the default DCM for the particular device. This override DCM not only contains the basic level 1 command set for the particular device but also includes vendor specific commands to control advanced features of the device. The model allows the device to inform another about its particular functionality. Since the override DCM may be loaded onto any vendor's FAV, the format of the DCM is architecture-neutral.

To allow one device to discover the capabilities of another device and to determine which command set to use with that device, a standard device description structure is provided called the self describing data (SDD) structure. The SDD data structure is extensible. It can be a small number of bytes describing the device type, e.g., TV, or VTR, etc. Alternatively, the SDD data structure can be a more complex structure also defining the override DCM and a graphical representation of the device. The graphical representation within the SDD data structure allows an FAV node to present a pictorial representation of the devices in the home network to users. By defining the graphical representation in a sufficiently generic manner, a device's SDD graphical data can be used in any vendor's product to display a user interface for that device. This provides an enhanced level of vendor interoperability and also allows a vendor to differentiate a product while maintaining within the general look and feel of the display device. This enables a control device (the FAV node) to present a general control user interface for all devices in the home network, irrespective of the differences in type and vendor.

As described above, Legacy devices are devices that were built before the HAVI architecture or devices that select not to use HAVI. HAVI supports Legacy devices by providing Legacy DCMs to provide protocol conversions for Legacy devices. These Legacy DCMs can contain sufficient knowledge to allow them to support an existing 1 or 2 way control protocol and provide a specific control interface to the devices that conform to HAVI. A legacy DCM acts as a bridge between the Legacy and HAVI devices. This approach allows HAVI also to interact with any future device control protocols such as protocols being used for home energy management or security.

It should be appreciated that the communications hardware and protocols used by the HAVI architecture are non-specific. The HAVI architecture is readily suited to the incorporation and use of any one of several communications mediums, with the simple requirement that the medium provides a generic communication mechanism that supports the HAVI interfaces. The basic model assumed is one of a logical communications back plane (e.g., IEEE 1394). All AV devices are assumed to be connected to this back plane, and can locate and communicate with all other AV devices, as shown in FIG. 1B. In a physical setting, it is likely that this logical back plane will consist of more than one physical communication medium. It is further assumed that multiple protocols may be in use on different physical media. The Home AV architecture abstracts above all of this and presents a generic model of communicating nodes. It will provide a mechanism above the Transport layer (functionally like a socket) to ensure network transparency. This mechanism can be described as "reliable, ordered datagram service" which will provide all fragmentation and re-assembly.

Accordingly, a goal of the present invention is to support each and every physical bus the same, such that an application need not care which physical transport it is using. However, with the familiarity of IEEE 1394 in the electronics industry, features of the present embodiment are illustrated and described in view of functioning with IEEE 1394. Other buses such as CEBus and USB may not require all the same features.

Referring now to FIG. 2, an exemplary peer to peer, two IAV node HAVI network 200 in accordance with one embodiment of the present invention is shown. HAVI network 200 includes a first IAV 201 (e.g., a television) coupled to a second IAV 202 (e.g., a receiver). IAV 201 and IAV 202 behave in a peer-peer manner, arbitrating for necessary resources amongst one another. They lack the resources to support the addition of a BAV or LAV device, but can perform meaningful activities within their context. The IAV is not required to provide any standard UI capability. There is no provision in the AV Architecture for "forward compatibility" or discovery of new functions (e.g. IAV 201 only knows the functions that IAV 202 supports based on SDD provided upon connection of IAV2). However, in accordance with the present invention, the features of the SDD can be easily exploited to perform "ad-hoc" feature discovery.

Figure 3:
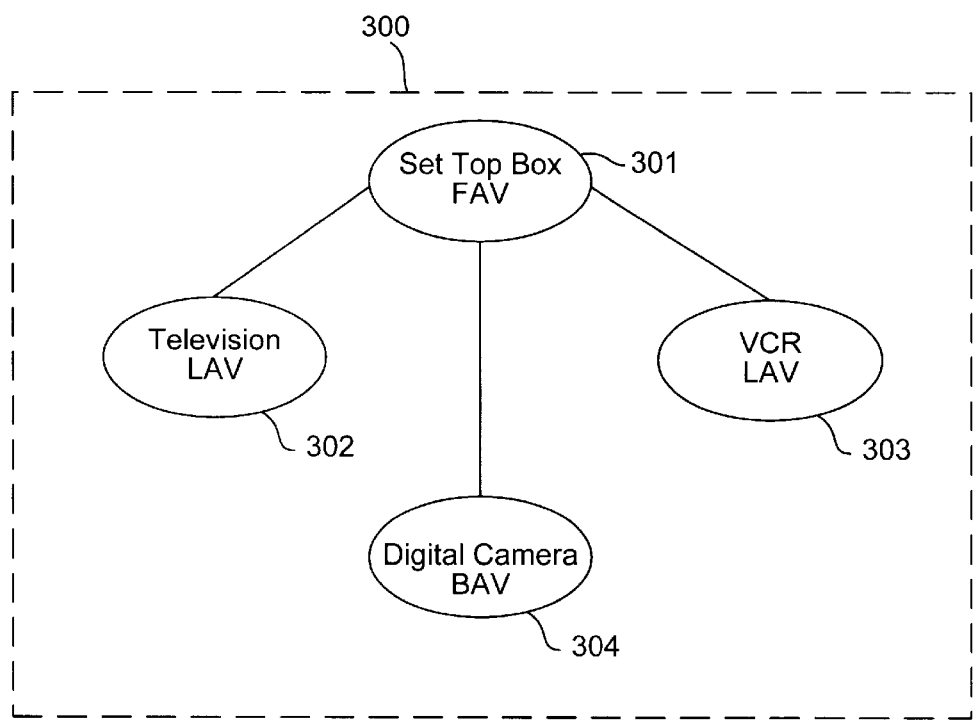
FIG. 3 shows a single FAV (full audio video) cluster HAVI network in accordance with one embodiment of the present invention.

FIG. 3 shows a single FAV cluster HAVI network 300 in accordance with one embodiment of the present invention. HAVI network 300 includes an FAV 301 (e.g., a set top box) respectively coupled to a first LAV 302 (e.g., a television) a second LAV 303 (e.g., a VCR) and a BAV 304 (e.g., a digital camera). In HAVI network 300, FAV 301 controls Legacy and Base AV devices (e.g., devices 302–304), providing cluster-wide services.

Figure 4:
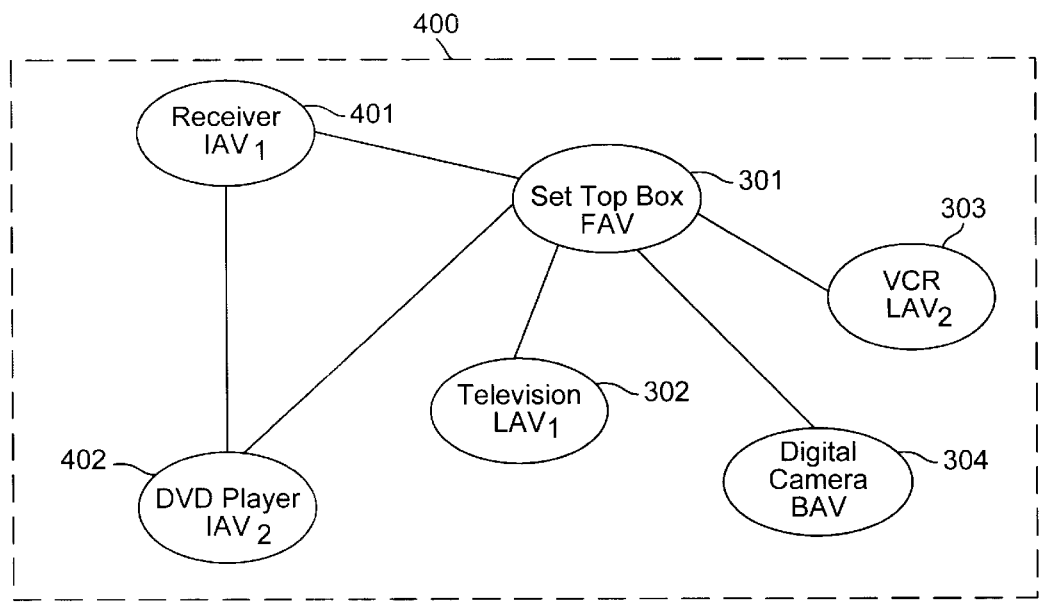
FIG. 4 shows an FAV cluster integrated with an IAV peer to peer HAVI network.

FIG. 4 shows an FAV cluster integrated with an IAV peer to peer HAVI network 400. In accordance with the present invention, the configuration of HAVI network 400 provides support for legacy devices 302 and 303 while enabling independent control to occur within the two IAV devices 401 and 402 when their resources are not in use by the FAV device 301. The IAV devices 401 and 402 behave as peers to the FAV device 301. For efficiency, a resource conflict policy can be implemented for both FAV to FAV or FAV to IAV resource requests. The IAV will be controlled by the FAV by via a DCM running in FAV 301.

Figure 5:
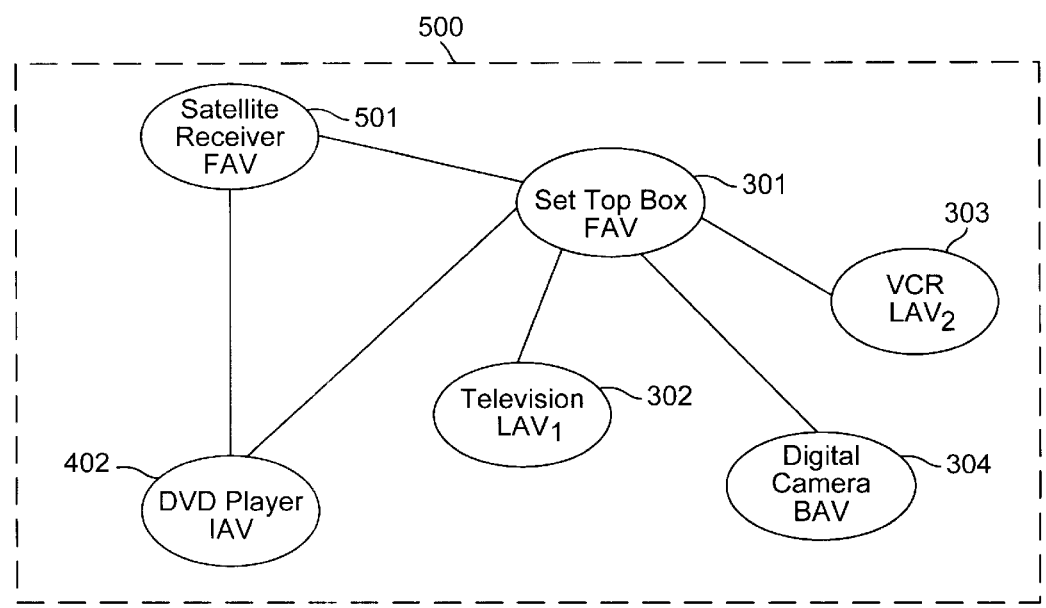
FIG. 5 shows an exemplary HAVI network having multiple FAVs.

FIG. 5 shows an exemplary HAVI network 500 having multiple FAVs. HAVI network 500 includes an additional FAV 501 (e.g., a satellite receiver). This configuration behaves in a similar manner to HAVI network 400 described above. In this configuration, the FAV devices 301 and 501 act as peers.

THE COMPUTER SYSTEM PLATFORM

Figure 6:
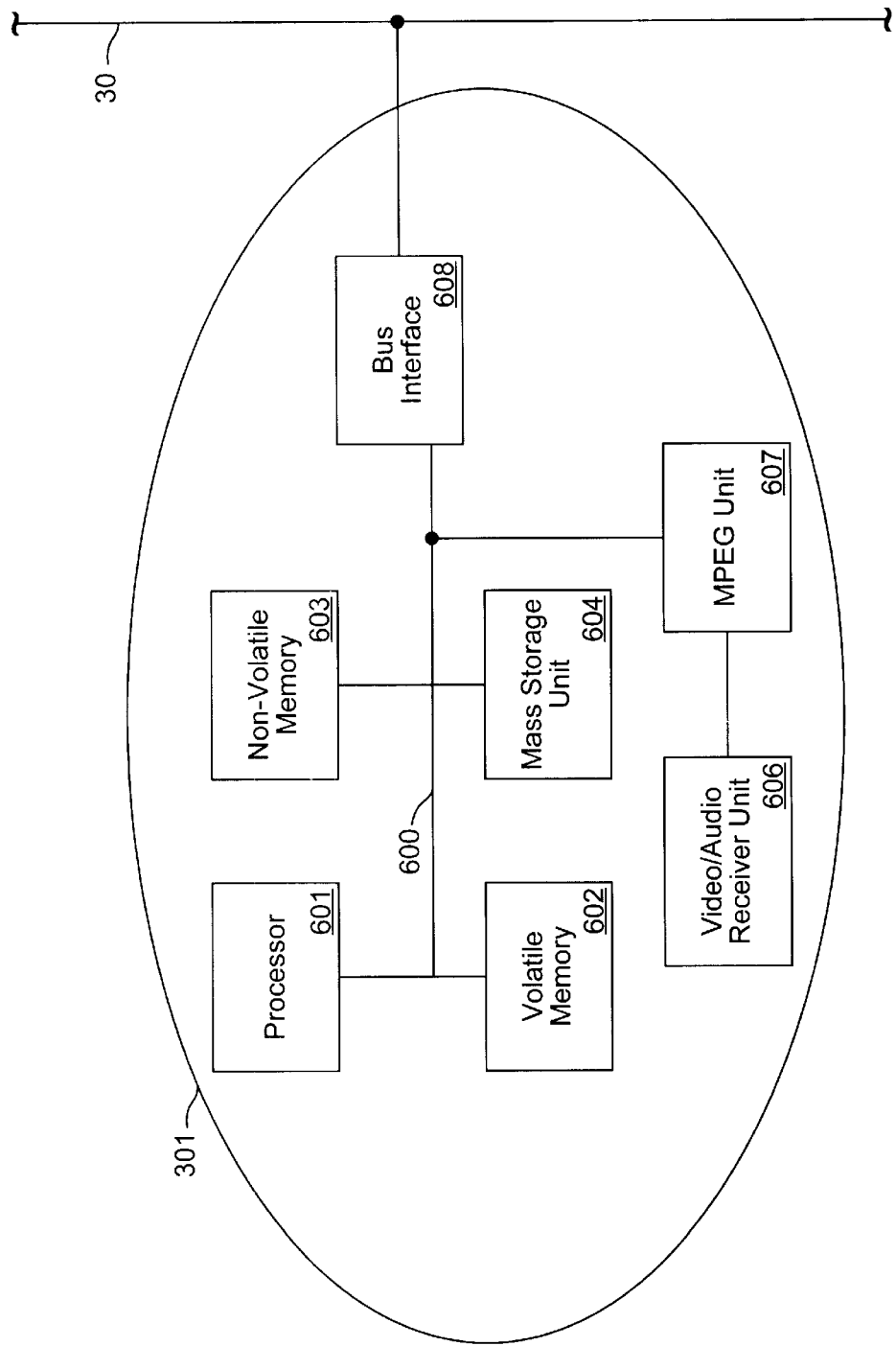
FIG. 6 shows a diagram of a set top box in accordance with one embodiment the present invention.

With reference now to FIG. 6, a diagram of a set top box 301 in accordance with one embodiment of the present invention is shown. As described above, any consumer electronics device can be a FAV and thereby provide a computer system platform for HAVI software. For instance, the set-top-box 301 device of the exemplary HAVI network contains special components that provide an operation platform for software components of the HAVI architecture which are described below. Specifically, aspects of the present invention, described below, are discussed in terms of steps executed on a computer system (e.g., processes shown in FIGS. 13 through 17A). Although a variety of different computer systems can be used with the present invention, an exemplary general purpose computer system is shown in the set-top-box of FIG. 6.

Set-top-box 301 of FIG. 6, in addition to having a video/audio receiver (decoder) unit 606 and MPEG unit 607 also includes an address/data bus 600 for communicating information, one or more central processors 601 coupled with the bus for processing information and instructions, a volatile memory 602 (e.g., random access memory RAM) coupled with the bus 600 for storing information and instructions for the central processor 601 and a non-volatile memory 603 (e.g., read only memory ROM) coupled with the bus 600 for storing static information and instructions for the processor 601. Set-top-box 301 can also optionally include a data storage device 604 ("disk subsystem") such as a magnetic or optical disk and disk drive coupled with the bus 600 for storing information and instructions. Also included in the set-top-box 301 is a bus interface unit 608 for interfacing with the local bus 30 (e.g., an IEEE 1394 serial bus).Set-top-box 301 can operate under a variety of different operating systems (e.g., Windows operating system, DOS operating system, Macintosh O/S), but in the present embodiment the Aperios operating system is used.

THE HAVI SOFTWARE MODEL

In accordance with the present invention, the computational units of the HAVI architecture (e.g., DCMs) are modeled as objects. Each object is a self contained entity, accessible through a well defined interface and executing within a well defined software execution environment. The software execution environment (e.g., set top box 301 from FIG. 6) provides a set of well defined services (locally or remotely) that are also modeled as objects and can be accessed, using the communications infrastructure, via their well defined interfaces.

Each object is uniquely named. No distinction is made between objects used to build system services and those used for application services. All objects make themselves known via the registry. Objects in the system can query the registry to find a particular service or device and can use the result of that query to send messages to that service or device. The identifier assigned to an object is created when the object registers. This identity, if required, is guaranteed to be persistent during the lifetime of the object and will remain persistent even in the face of a complete reboot of the home network.

In accordance with the present invention, the objects communicate using a message passing model. An object that wishes to use the service of another object, does so by using a general purpose message passing mechanism that delivers the service request to the target object. The target object is specified using the unique object identifier discussed above. While in the present embodiment the message passing mechanism functions with IEEE 1394, it should be noted that there is no distinction between sending a message across a 1394 bus, or over a Control Al link. In the same manner, there is no distinction between objects on the same node and one on a remote node. The actual implementation of the message passing infrastructure will depend on the system and networking environment and will differ from node to node and between vendors. However, the actual format of the messages must be common so that interoperability is assured.

It should be appreciated that the general intent of the object model and messaging system is to provide a completely generic software model that is sufficiently flexible to allow multiple implementations with a variety of software systems and languages. Details of the binding between messages and the code that handles them are left to the system implementor.

SOFTWARE ARCHITECTURE OVERVIEW

The HAVI software architecture defines the way that the software model is used to support the HAVI architecture. In particular it defines the way that devices are abstracted and managed within the AV architecture. It defines the ways that interoperability is assured, and it defines the ways that future devices and services can be integrated into the architecture.

Full AV nodes as software managers: In accordance with the present invention, Full AV nodes (FAVs) act as managers for Intermediate (IAVs) and Base (BAVs) nodes and provide a platform for the services that support the HAVI architecture. To achieve this they provide an execution environment which allow objects to control and communicate with services and devices. To ensure that devices are accessible within the Home AV network, the FAV nodes support a software abstraction of the services that a device offers to others. As described above, this abstraction is referred to as a device control module (DCM). The DCM is modeled as an object within the software architecture but is refereed to hereinafter simply as the DCM to distinguish it. The interface that the DCM exposes to the rest of the system provides the means to access and control that device. In the general case, a FAV will manage a set of DCMs, one for each IAV node and base node in the home network or portion of the IAV network that it manages. Thus, it should be appreciated that from an interoperability perspective, the primary role of the FAV node is to manage DCMs of the present invention and act as an execution environment for DCMs.

Full AV node as controller and display device: In accordance with the present invention, in most cases, FAVs will have an associated display device which is used for display of AV content and of user interface (UI) material. However, the HAVI software architecture does not mandate this and FAV nodes may be "headless". In this case they will cooperate-operate with other nodes to display content and UI information (see below). However, FAV devices will be responsible for supporting the high level UI APIs that provide the look and feel of the entire home network. The lower level graphic manipulation APIs will generally be located close to the graphics display device itself and are manipulated by the FAV high level APIs.

Peer to peer architecture between full AV nodes: In a Home AV network in accordance with the present invention, there may be more than one FAV. In this case, each FAV cooperates with other FAVs to ensure that services are provides to the user. This allows FAV nodes to cooperate to share resources. For example, an FAV node that does not have direct access to a display device, may use a remote FAV node to display DCM user interfaces. Alternatively, a FAV node may require the services of a data translation module that exists on a remote node to allow it to set up a data route between two AV devices.

LEVEL 1 AND LEVEL 2 INTEROPERABILITY GENERALLY

In accordance with the present invention, one of the major goals of the HAVI architecture of the present invention is to support interoperability between devices. This includes existing devices and future devices. To achieve that interoperability, the HAVI architecture of the present invention supports a general model that allows two levels of interoperability. These levels are referred to as Level 1 and Level 2.

Level 1 interoperability: Level 1 interoperability of the present invention addresses the general need to allow existing devices to communicate. To achieve this, level 1 interoperability of the present invention defines and uses a generic set of control messages (commands) that enable one device to talk to another device and a set of event messages that it should reasonably expect from the device. To support this approach a basic set of processes are required. These processes include device discovery, communication, and a generic message set.

The device discovery process of the present invention provides for the fact that each device in the Home AV network needs a well defined method that allows it to advertise to others its characteristics. The approach we have adopted is to specify a data structure, required on all FAV and IAV devices, that contains information about the device and which can be accessed by all other devices. This data structure is referred to as a Self Describing Data structure (SDD). The SDD contains, as a minimum, enough information to allow another device to discover its basic capabilities and so infer the basic set of command messages that can be sent to that device and events it should reasonably expect to receive from that device.

The communication process of the present invention provides for the fact that once a device has determined the capabilities of another device, it then needs to be able to access those capabilities. To achieve that requires a general communication facility that allows one device to send a message containing a command request to another device. The general message service processes of the present invention were discussed above.

Generic message set refers to the process required to support level 1 interoperability. This includes a well-defined set of messages that must be supported by all devices of a particular class. This ensures that a device can work with other devices, irrespective of the manufacturer, because all devices agree to a common set of generic commands. As discussed above, within the HAVI software architecture of the present invention, these commands are presented as a DCM to the rest of the system.

These three basic processes of the present invention support at least a minimal level of interoperability. Since, in most cases, any device can query the capabilities of another via the SDD, any device can determine the command set supported by another device. And since each device has access to a generic messaging system, then any device can interact with any other device.

However, it should be appreciated that level 1 compatibility in accordance with the present invention only ensures that devices can interoperate at a minimal or degraded level of functionality. The generic message set for each device class is a minimal and common set of commands. The SDD facility offers a means to provide some degree of customization of a device by providing information about its UI and some aspects of its interaction model. Other IAV devices can use this information to present an interface to the device. Alternatively, any FAV device can use this information to customize the generic DCM it has created for the device. However, it should be noted that a more extensible mechanism is also needed to allow a device to communicate to other devices any additional functionality it posses. Level 2 interoperability of the present invention provides this mechanism. Level 1 and Level 2 interoperability are discussed in greater detail below.

LEVEL 1 AND LEVEL 2 DCMs

As described above, the DCM of the present invention functions by providing access, control and interaction with a device. DCMs are typically instantiated (e.g., executed) on the resources of FAVs in the Home AV architecture. The DCM of the present invention provides an interface to a device and manages a UI that the device wishes to present to users.

In accordance with the present invention, with the level 1 interoperability, the DCMs created for devices are generic. They support a minimal command set that allows generic control of the device. To support device specific features requires that the DCM provide access to such device specific features and is capable of presenting device specific features to users via the UI.

To achieve this, Level two interoperability is used. In accordance with the present invention, the Home AV architecture allows a device to provide an "override" DCM for the generic DCM that would normally be created for that device. The override DCM (e.g., level 2 DCM) is capable of replacing the default DCM (e.g., level 1 DCM) on the FAV. It should be appreciated that the level 2 DCM could be retrieved from a variety of sources. One such source is the SDD of the device itself. In this case, the level DCM is fetched, received, or otherwise acquired from the SDD of the device and instantiated in an FAV node when the device is installed into the system. Because the Home AV architecture is vendor neutral, it is necessary that the level 2 DCM work on a variety of FAV nodes, each with potentially different hardware architectures. To achieve this, the format of both the level 1 and level 2 DCMs of the present invention are architecture neutral such that a wide variety of software execution environments of the FAV nodes are able to instantiate and run the level 1 and level 2 DCMs.

It should be appreciated that, in accordance with the present invention, once created and running within a FAV node, the DCMs of the present invention communicate with the IAV and BAV nodes in the same manner as described above using the basic messaging mechanism.

As described above, there are many permutations of FAV, IAV and BAV nodes possible within a given HAVI network. These permutations generally fall into two types: HAVI network configurations that support an FAV device, and those that do not. This distinction essentially defines whether a HAVI network will be using a peer to peer configuration (e.g., as shown in FIG. 2, where no FAV is present) or will be imposing some form of control hierarchy (e.g., the FAV cluster as shown in FIG. 3).

In accordance with one embodiment of the present invention, in the cases where no FAV is present, only level 1 interoperability is available and the devices are forced to use SDD information to discover other IAV capabilities, present those capabilities, and control the device. In the cases where FAVs are present, DCMs are instantiated and uses. If these are level 1 (e.g., generic) DCMs, the devices are operating at level 1 interoperablity. If there is at least one level 2 DCM present, then some of the devices are operating at level 2 interoperability.

In accordance with the present invention, it should be noted that a mixed mode of operation is possible in which clusters of devices are inter operating under control of an FAV node, while other devices are interoperating in a peer to peer fashion. In this manner, the flexibility of the present invention allows vendors the freedom to design and build devices ate all points on the cost/capability spectrum with the certainty that these devices will inter-operate seamlessly with other devices in the HAVI network.

Figure 7:
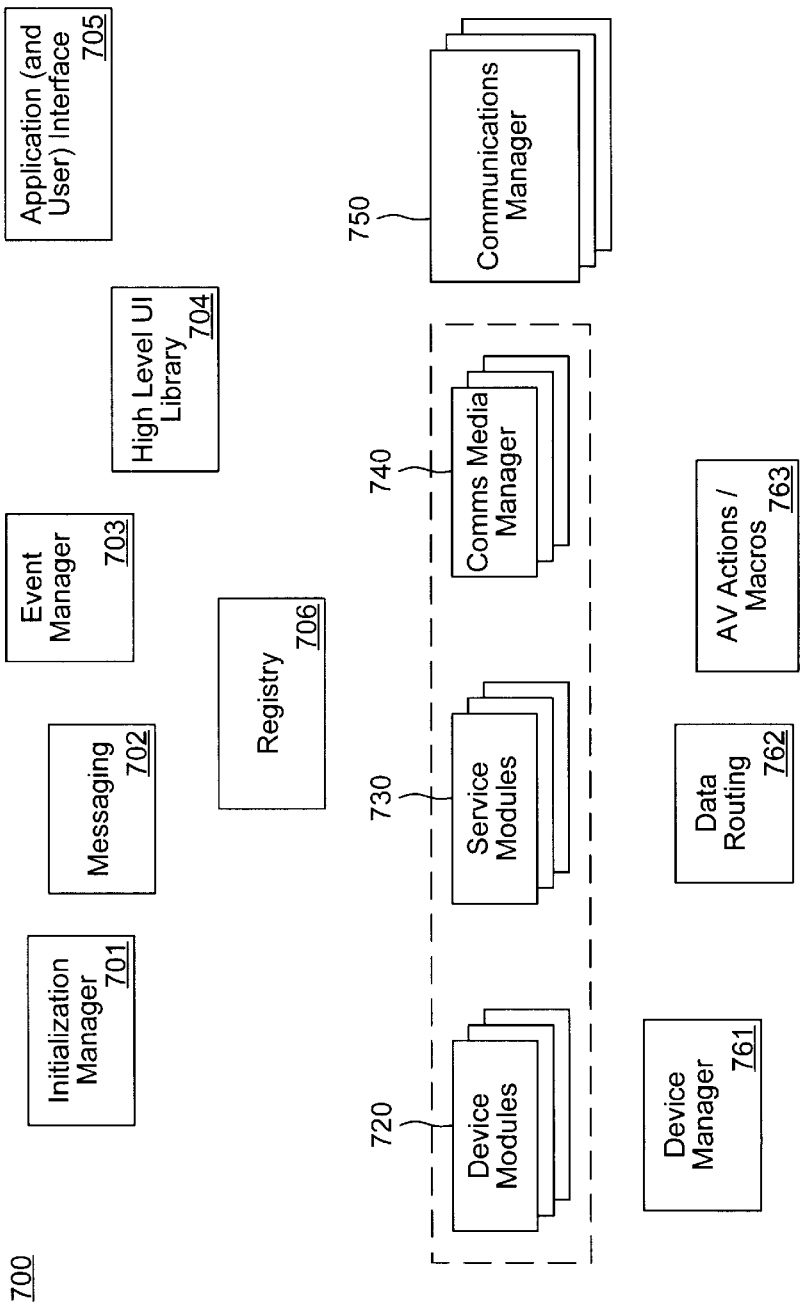
FIG. 7 shows a logical block diagram of one embodiment of the HAVI architecture of the present invention.

Referring now to FIG. 7, a logical block diagram 700 of one embodiment of the HAVI architecture is shown. FIG. 7 shows an overall HAVI architecture in accordance with the present invention. The components shown in diagram 700 are as follows:

Device manager 761: Device manager 761 is responsible for creating and managing the DCMs that represent devices managed by an FAV device.

Device Modules 720: These are the DCMs for individual devices. As described above, each DCM functions as a control point for a device and provides a UI component and a control component. The DCMs (e.g., device modules 720) provide an API to allow other applications to access and manipulate the devices.

Service Modules 730: These modules can be viewed as software devices They are DCMs for any software component (as opposed to a hardware device) that provides a general service to other devices or components in the home network.

Comms Media Manager 740: This component is responsible for managing the underlying physical communications process. It provides an API that allows code modules to interact with the features of the communications media (e.g., IEEE 1394).

Registry 706: This is a service database. All DCMs for physical devices and software services will register themselves in the registry 706 and all modules (e.g., device modules 720) can query the registry to get a handle for another device or module.

Communications manager 750: This component is a low level abstraction of the communications media.

Messaging 702: This component provides a basic message passing facility to allow both devices (hardware) and device modules 720 and service modules 730 to communicate with each other.

Event Manage 703: This module provides a generic event service. This is a one-to-many communication service allowing notification in the HAVI network.

Initialization manager 701: This component is used as part of the device bootstrap process.

Data routing 762: The data routing component 702 is responsible for helping services set up routes between devices and devices modules. It takes into consideration the 'cost' of transferring data via a particular route, the requirements on data format translation etc. This component is not needed for the basic architecture.

AV Actions/Macros 763: this component is a manager for higher level AV actions which are groups of individual low level commands, i.e. it provides a macro service. This component is not needed for the basic architecture.

High level UI library 704: This component provides a set of high level UI components that are used by device modules 720 to build UIs for their corresponding devices. This component is not needed for the basic architecture.

Application (and User) interface 705: This component provides the linkage between a common consumer electronics platform (CCEP) APIs of the HAVI compliant devices and applications which are local or possibly remote. This component is not needed for the basic architecture.

It should be appreciated that the above components as diagrammed in FIG. 7 are abstractions of functionality. They are designed to make clear what functionality is included in the architecture for HAVI compliant devices. In order to avoid unnecessarily obscuring the present invention, the relationship between components 701–763 and the message flows between them are not shown.

DCM CONFIGURATION AND FUNCTION

Overview

In one embodiment of the present invention, in HAVI network configurations where a FAV node is available, a DCM exists for each physical device in the HAVI network known about by that FAV node. The DCM provides an interface to the device and presents it as an object in the architecture. Other DCMs, system services or application services can query the local registry to find out the devices available and to get an identifier to allow them to interact with the devices via its DCM.

Device control modules are also responsible for interacting with the software architecture to present the device user interface (UI) to the user. Input from users is then passed to the DCM which uses the input to control the actual device.

As discussed above, DCMs support the level 1 and the level 2 interoperability. A level 1 DCM is a generic DCM, usually supplied with the FAV node, and capable of managing a basic, pre-defined set of features of a device class using a pre-defined message set. During initialization, the DCM will work with the Device manager (below) to discover the actual characteristics of the device to be managed, and will configure itself to control that device. Thus a generic VCR controller could be instantiated to control a standard VCR using either 1394 AV/C messages, or via Control A1.

In the case of level 2 interoperability, the DCM instantiated for that device will be an override DCM that has been loaded from an external source, e.g. the device itself. These override DCMs are written in the common language format for DCMs. The functioning of an override DCM doesn't differ from generic ones but the API offered is likely to be more comprehensive.

Once instantiated, DCMs will provide not only control interfaces for the device, but also access to SDD data associated with a device. They will act as event managers for a device, receiving device specific events and posting those to the event system (see below). They will also act as UI manager for the device, interacting with the UI management system to provide a user interface via some display device. Lastly, the DCM will operate as a resource manager for devices, arbitrating requests made for device access and service.

General DCM Terminology

In the terminology of the present invention as used in the following descriptions, each DCM presents a model of a device in the home network. The basic terminology used is as follows:

1) Device: This term refers the entire device.
2) Subdevice: This term refers to one of possibly many components that make up a device. Some technologies do not have the ability to distinguish subdevices.
3) Internal Connection: This term refers to the logical or physical connection between internal subdevices.
4) External Connection: This term refers to the connection between a physical connector on the outside of a device and a destination device outside the device. The same as unit Serial Bus and external input and output plugs for AV/C.
5) Protocol: This term refers to the control protocol spoken by the sub-device or device (e.g., AV/C, Control A1, etc.). It should be note that a device may contain subdevices which speak different protocols.
6) Interface: This term refers to the physical bus connection interface (1394, USB, etc.).
7) Device Class: This term is one way to describe the basic functionality of a given collection of devices. For example, the class of DVCR devices can record data to a tape medium. Likewise, there may be many devices that can take audio input, perform some kind of special effects, and output the modified audio stream. These would all come under the class of audio processor or something like that. The usefulness of this concept will become more apparent later in the document.
8) Device Model: This term refers to the collection of subdevices and connections that make up either a standard or custom device definition. Individual subdevices that are accessible within physically separate devices can be combined to form logical or virtual devices using the device model.
9) Standard Device: This term refers to standard model definitions (e.g. a DVCR device is composed of at least a tuner subdevice and a VCR (transport) subdevice, with plugs between them).
10) Special Device: This term refers to a vendor-specified device model, composed of either standard subdevices or a combination of standard and vendor-specific subdevices. For example, a dual deck DVCR may have two VCR subunits, which are standard items, but in a non-standard configuration.
11) Aggregate devices: This term refers to logical entities which can be combined from a variety of components. Physical devices and subdevices are individually accessible pieces of hardware. When devices have accessible subdevices, this model is extended to support aggregate devices. Examples of aggregate devices include subdevices from separate physical devices or within a single device, and software modules such as software codecs which provide services or capabilities similar to devices and subdevices. These modules can all reside in the same node on the AV network, or can be distributed among many nodes.

Device Classification

Classifying devices based on the kind of actions they perform, or the kind of medium they deal with, is a way of allowing us to create a generalized control API that will work for devices that are created in the future. The intent is to allow a high percentage of basic functionality to always be accessible regardless of the type of device or the manufacturer of the device.

Any manufacturer-specific or device-specific functionality that is controllable as well but falls outside of the generalized control API will only be accessible via the SDD information and other techniques for extending a DCM.

In the most general terms, the classification of devices or subdevices can be described by their main functionality. The AV/C control protocol of the 1394 standard uses a convenient method of classifying devices which we have adopted below. Following is the first set of factors used for classifying a device or subdevice:

1) Whether a particular device has a transport mechanism.
2) Whether the usefulness of this subdevice defined mostly by the fact that a signal ends up here (regardless of the fact that it may be propagated without changes).
3) Whether a particular subdevice a signal source (e.g., does it have a signal output).
4) Whether a particular device accepts input, performs some sort of processing, and then outputs modified data.
5) Whether there is no signal input or output of any kind (e.g., is the device a utility of some kind, such as a mechanism for positioning a satellite antenna).

In accordance with the present invention, at a second level of classification, we can study devices that contain a transport mechanism. In this case, a general question would be "does this device deal with removable media?". If it does, then a basic set of controls is applied, such as Play( ), Stop( ) and even Search( ). Devices with media can be queried for their ability to record, to determine the organization of information on the medium (is it track-based? continuous such as a tape? how is it measured SMPTE time codes, time offset from a certain position, etc.).

In the present embodiment, a signal processing service can be described by the kind of signal(s) it can accept, and the kind it can produce as a result. This requires the establishment of common definitions for describing signal types and methods for accessing the services, so that any client can know how to describe what kind of service it is looking for, and how to access that service.

Any device which accepts one kind of data and has the ability to transmit that data on a different type of connection (for example, it takes digital video as input and has standard analog video RCA jacks which can send that data back out) can act as a data converter class. The DCM for these devices will register itself as a data converter in the system registry, so that clients can find them and use them as necessary.

Device Access and Control

In accordance with the present invention, once a basic device classification has been made, then the generic DCM instantiated for that device will provide an API that causes control messages to be sent to that device. The base set of control messages that can be sent or received (in the case of events) to a particular class of device are standardized and detailed in the appendix (not available in this version of the document). In the present embodiment, these messages represent a basic API presented by the DCM.

Device Management

In accordance with the present invention, the DCM API also provides a set of higher level services that allow more sophisticated management of the device. Examples of this include device reservation and event management. In the case of device reservation it is likely that a request for a device may be refused due to existing requests on the device, alternatively, the device request may be for a future reservation for a time based macro. In these cases the DCM provide an interface to allow an application or service to queue requests with the DCM, i.e. reserve a device, or to receive notification when a device becomes available.

Connection Management

The DCMs of the present invention also provide a high level API to allow other objects to query the state of connections between devices and to manipulate those connections. This API is primarily used by the Route manager but is available to any object in the system. Connection management allows connections to be established, both internally between subdevice units, and externally between devices. Connection status can be queried and connection capabilities (signal formats) can also be queried. SDD management.

The DCMs of the present invention also provides a generalized interface to SDD management. This allows the SDD data in the device to queried and used. The API is divided into two parts, part 1 provides APIs for getting well know information from the SDD data including the DeviceImage, its name and the URL (if available) of a location for an override DCM or other icons to be used in representing the device's UI. Part 2 of the SDD API is designed to provide more detailed access to functional aspects of the device.

Device Representation and User Interface (UI)

In accordance with the present invention, the DCM is also responsible for the UI aspects of the device. In the case of level 1 interoperability, a generic UI is used to interface with users. This may be augmented by basic SDD data that allows such aspects as UI icons to be specified and accessed by the generic DCM. In order to avoid unnecessarily obscuring the present invention, the details of how the DCM interacts with the UI management system to present a device specific UI is not discussed in detail. In the present embodiment, however, the basic model is that internal management code within the DCM works with the UI management system to present a UI for the device. User input is then forwarded by the UI management system, to the DCM which then converts it into device specific commands. These commands are sent, using the basic messaging system, to the device. If replies are received then these are passed via the DCM up to the UI. In addition, any status changes of the device, e.g. on/off are also passed, via the event system to the DCM which uses them to update the UI.

Service Modules

Service modules (e.g., service modules 730) are conceptually similar to device control modules. They provide an interface to a service which is usually provided by software only. In the present embodiment, service modules are of two types, system services and application services. A system service is a well know service that is provided as part of the HAVI software architecture. Examples of these types of services are data format translators, protocol converters or graphics services. These services have well known APIs which are defined as part of the HAVI architecture. Application services are objects that have been created for and by other service objects. These objects provide a well defined API, however that API is not public. In the present embodiment, any application or other object that wishes to use an application object needs to know its API and calling semantics. Although not required, generally, system services will exist for the lifetime of the system. Application services will exist for the lifetime of an application and may be quite short lived.

System Services

In accordance with the present invention, many of the services provided by the AV architecture are provided as service modules, who register their services in the system registry and can be accessed using messaging. Examples of such services are the UI service modules that provide a mechanism to allow devices to present a UI to the user, data format services that convert AV data between different formats.

THE DCM MANAGER

Overview

In accordance with the present invention, the DCM Manager is responsible for all aspects of handling the collection of DCMs resident on a FAV node. This includes the tasks of discovering, instantiating and disposing of all possible device control module candidates that are available to a given system. Device resource management is generally carried out by individual DCMs, however, where multiple devices or services are interacting and where some of the DCMs are located on different FAV nodes, higher level management will be needed. Therefore, the DCM Manager communicates with other DCM Managers on remote nodes to arbitrate for network-wide device and subdevice resource allocation and management. Its responsibilities are discussed below.

Discovery and Enumeration of Physical Devices

In accordance with the present invention, the DCM Manager works with the underlying OS services to obtain a raw list of available devices. Note that depending on the underlying bus technology, these DCMs may be dynamic. In the present embodiment, for example, as physical devices come and go on a 1394 bus the DCMs will come and go with them. In the same manner, the service and aggregate device DCMs are also dynamic, being created and destroyed in response to events in the FAV node.

This task requires interaction both with elements of the AV architecture and also with elements of the FAV host OS, node hardware and communications hardware. Due to this, the exact process required for device discovery will depend on the system environment. However, the general approach, of querying a device and any SDD data it contains to discover its characteristics, as discussed in the DCM section, is common. In the present embodiment, this requires the DCM manager to follow a set of rules in a given sequence each time the system is initialized, or any time the system may change (such as when the bus is reset).

Creation of Generic DCMs

In accordance with the present invention, for each node, the DCM Manager does enough work to determine that it should create a DCM. This work is carried out for all media-related devices which will be managed by the FAV node. In the present embodiment, Devices under a different management technology, e.g. USB based devices, may be presented within the architecture as DCMs on nodes that support USB communication, or as special DCMs that act as proxies for a remote management system. It should be noted, however, that some USB-based devices such as hard disks may in fact be made to appear simply as random-access media recording or playback devices; in these cases, they are treated like any other "real" media device. In the present embodiment, for each media-related entity, the DCM Manager will create a generic or level 1 DCM. Each DCM will later have the responsibility to make itself more device-specific if possible. This is described below.

Integration of Level 2 DCMs

In case s where an over-ride (e.g., level 2) DCM is available and accessible, the DCM manager is responsible for attempting to fetch that DCM and installing it into the FAV node. In the present embodiment, the details of how the over-ride DCM and the generic DCM interact is dependent on the DCM developer. For example, in some cases it will completely replace the default DCM, in others it will work with the default DCM to augment its capabilities.

In accordance with the present invention, manufacturer-supplied level 2 DCMs may come from a variety of sources. Devices may carry them within their ROM or some other storage mechanism such as the header of a disc or tape. They may be downloaded from a web or ftp site if such capabilities are accessible to the FAV node, or they could be supplied in the typical computer industry manner, via an installation from a disk or other storage medium. Allowing this manufacturer-supplied over-ride DCM capability requires a model for creating and installing DCMs. In the present embodiment, when installed, the level two DCM will provide the same base interface to the client as a level 1 DCM, while either providing additional interfaces or just underlying functionality modifications.

DCM Disposal

In accordance with the present invention, the DCM Manager will be responsible for disposing of DCMs at the appropriate times, and notifying clients that DCMs have been removed. In the present embodiment, the rules for when DCM disposal occur, and the distribution of responsibility for clean up, between the DCM and the DCM Manager, are tailorable to for the specific requirements of a particular HAVI network.

Coordinate Amongst Multiple DCMs

Some complex services among multiple DCMs, for example, command queuing of complex operations, etc., require the DCM Manager to coordinate with multiple DCMs to carry out these operations. This will be influenced by the "command model" that is provided for clients. For example, if we define an upper level API that allows clients to specify actions that are based on HH:MM:SS:FF time codes, then we need to translate between this time model and whatever the hardware or underlying support modules deal with. It should be noted that complex time-based operations that are affected by mechanical delays, etc., need to be accounted for. This type of coordination requires some notion of real time behavior in the network and is dependent on the physical and software infrastructure providing some level of guarantee.

Figure 8:
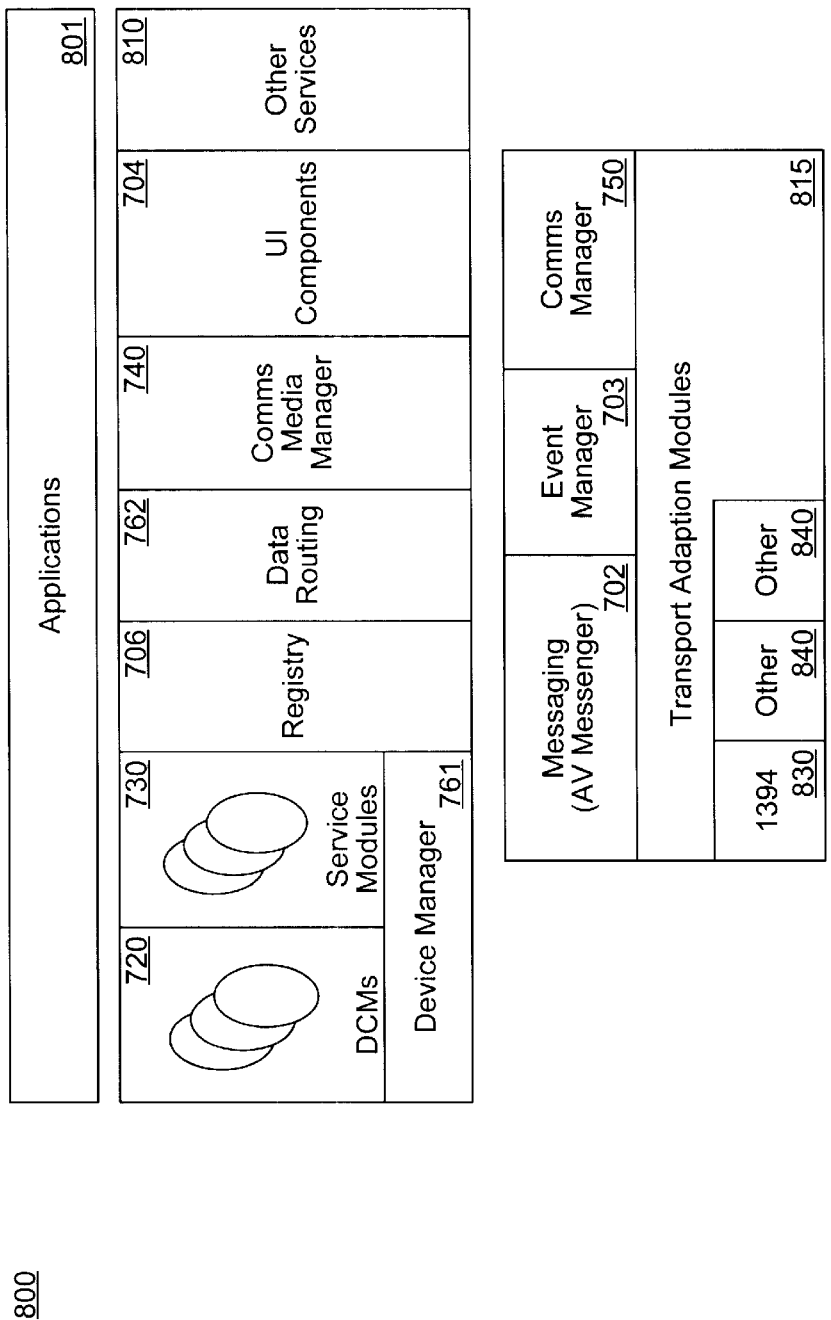
FIG. 8 shows a layered logic diagram of one HAVI architecture in accordance with the present invention.

Referring now to FIG. 8, a layered logic diagram 800 of one HAVI architecture in accordance with the present invention is shown. The components shown in diagram 800 are similar to those shown in diagram 700, however, diagram 800 is organized such that high level processes are on top (e.g., applications 801) with respect to lower level processes on the bottom (e.g., 1394 module 830). Diagram 800 also depicts other services 810, transportation adaptation modules 815, and other modules 840.

As described above, the overall HAVI architecture can be shown as communications components and service compo-nents. Applications 801, at the highest level in the architecture use the services and the communication components (e.g., DCMs 720, service modules 730, etc.). In turn, a number of the service components (e.g., service modules 730, DCMs 720, etc.) will use the underlying communications components (e.g., messaging 702, transportation adaptation modules 815, etc.). For example, in the case of one of applications 801 requesting, via the registry 706, the handle for a DVTR (digital video tape recorder) device, and then sending a play command to the device. As described above, components in the HAVI architecture communicate using the underlying messaging system, i.e. the modules use message passing.

Figure 9:
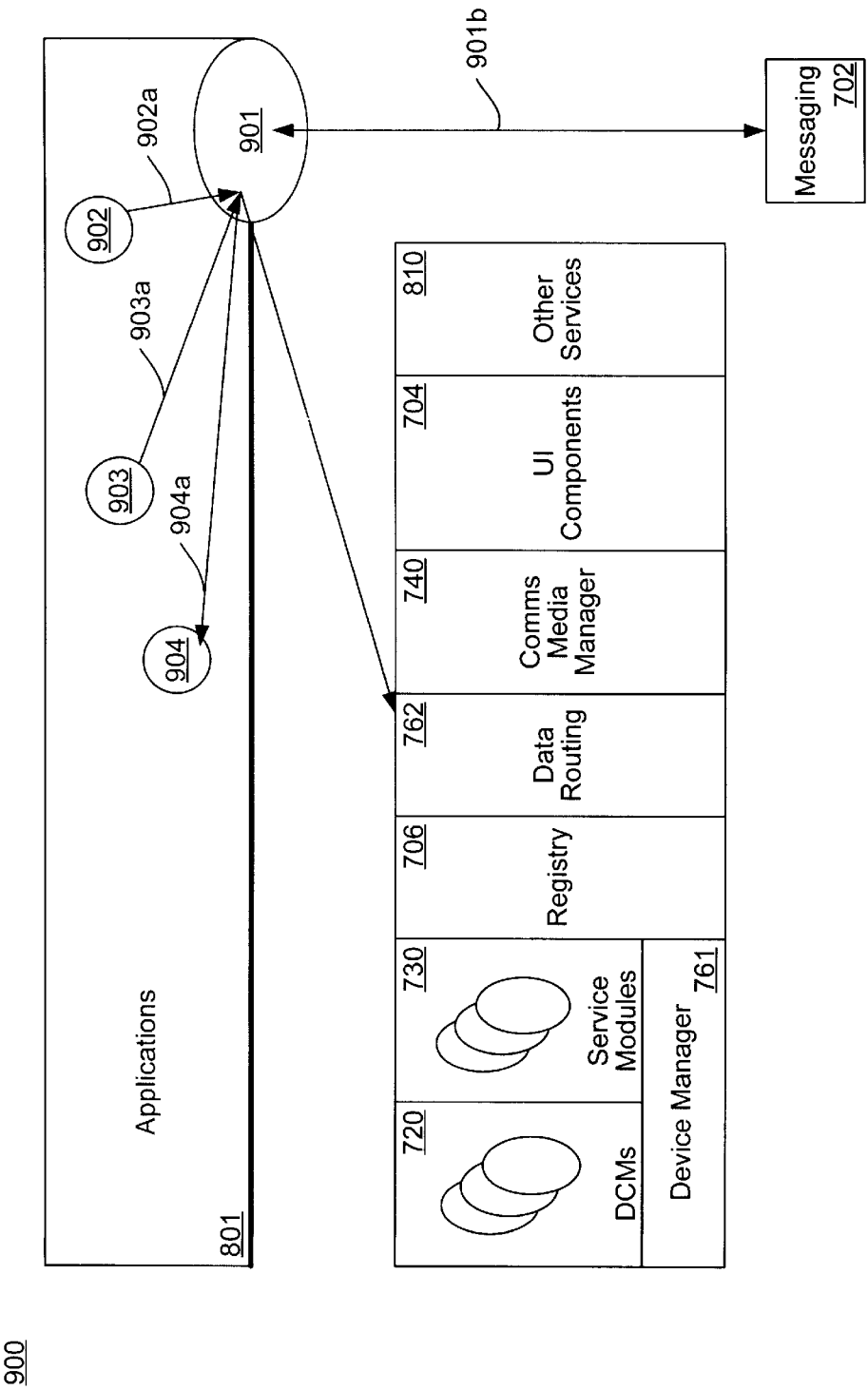
FIG. 9 shows a diagram of local and remote messaging in the HAVI architecture of one embodiment.

FIG. 9 shows a diagram 900 of local and remote messaging in the HAVI architecture of one embodiment. The messaging component 702 is shown handling both local messaging and remote messaging. Hence the messaging component 702 is depicted at the base of diagram 900. Local messages are shown as arrows 902a, 903a, 904a, to various applications 901–904. A remote message is shown as arrow 901b. For the sake of clarity, in diagram 900 and in the following discussions, local communication via the messaging system is not depicted, rather, local messaging (e.g., arrows 901a–904a) are shown as if based on direct function calls between components.

Figure 10:
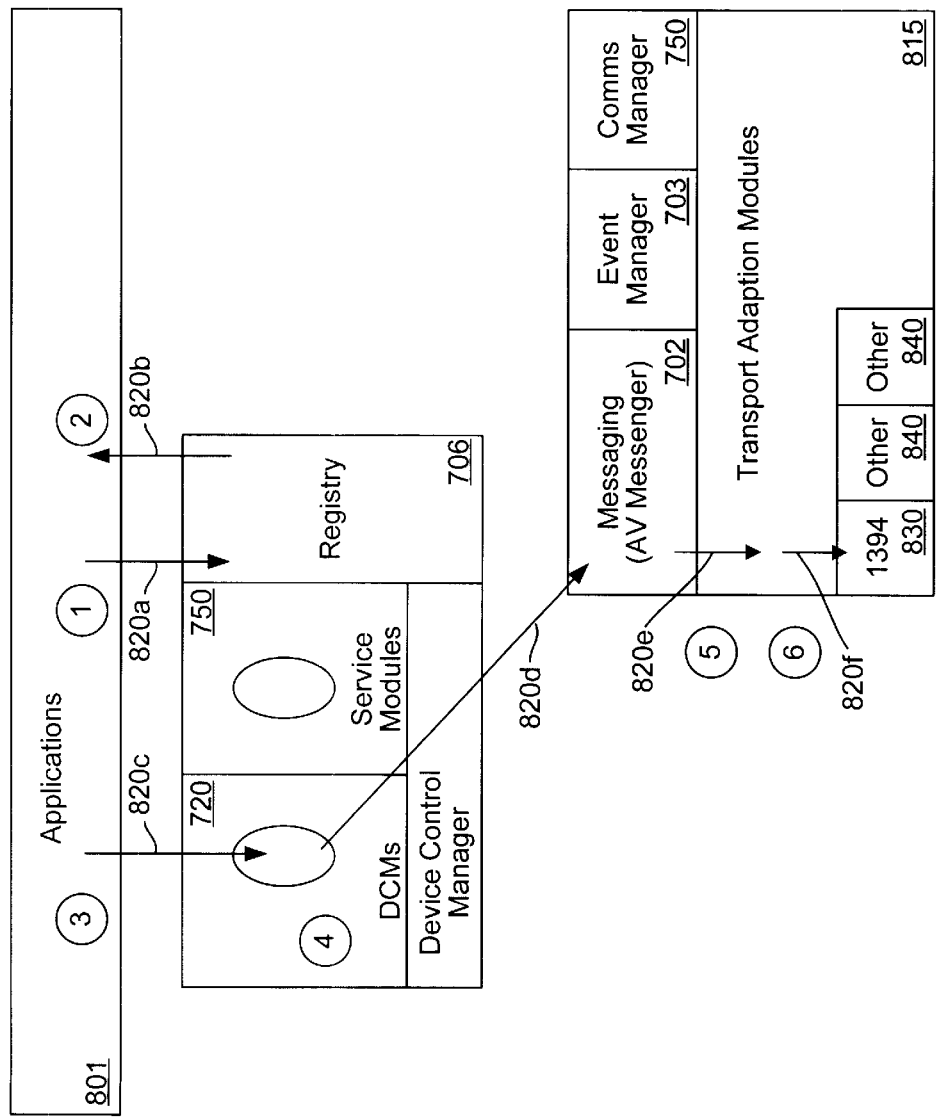
FIG. 10 shows a diagram of a message being sent via 1394 in the HAVI architecture of one embodiment.

FIG. 10 shows a diagram 1000 of a message being sent via 1394 in the HAVI architecture of one embodiment. In diagram 1000, message 1 (e.g., arrow 820a) is a request from one of applications 801 to the registry 706 (via the query API) for the handle of a DVTR device. The registry 706 returns a handle for the DVTR DCM in message 2 (e.g., arrow 820b). This handle is the message address used for the messaging system.

In accordance with the present invention the application then uses the handle to invoke the DCM for the DVTR with message 3 (e.g., 820c). The DCM converts the application invocation of the play call to an internal command which is sent to the messaging component, message 4 (e.g., arrow 820d). This internal command is part of the well defined command set at level 1, i.e. it is a HAVI command. The messaging component 702 then internally uses the handle information to determine which bus this device resides on. When it discovers that it is on the IEEE 1394 bus, it uses the IEEE 1394 transport adaptation module (TAM) 830 to convert the message to a 1394 packet, message 5 (e.g., arrow 820e), which is placed in the data portion of a FCP packet. The TAM then calls the 1394 device driver, message 6 (e.g., arrow 820f) to send the message over 1394.

At the receiving side (not shown), the message will be delivered to the 1394 device driver, and then passed up through a 1394 TAM to the Messaging component. The messaging component will receive a HAVI message packet which it will then deliver to the receiving code directly via a message queue or callback function. In the present embodiment, if the receiving device is an IAV device, it will only have the communications component of the CCEP architecture and the registry. Any other functionality it has will be device specific.

It should be noted that the previous example in FIG. 10 illustrates a distinction in the HAVI architecture between the messaging system and the command set used to control devices. In accordance with the present invention, the messaging system is a generic messaging mechanism that provides a message packet with a data section whose contents are completely opaque to the messaging system. For example, the messaging system can carry private application to application commands, AVC-CTS commands, CAL commands or any other command. The DCM is the entity responsible for communicating with remote devices, it uses the messaging system to carry commands specific to that device. For a level 1 HAVI compliant device, the command set carried by the messaging system is defined as part of the CCEP architecture. Messages carried by the messaging system between DCMs and devices they control contain these well defined commands. For level 2 devices the extended command set is undefined, these may be pure AV/C-CTS, CAL or any other commands.

Figure 11:
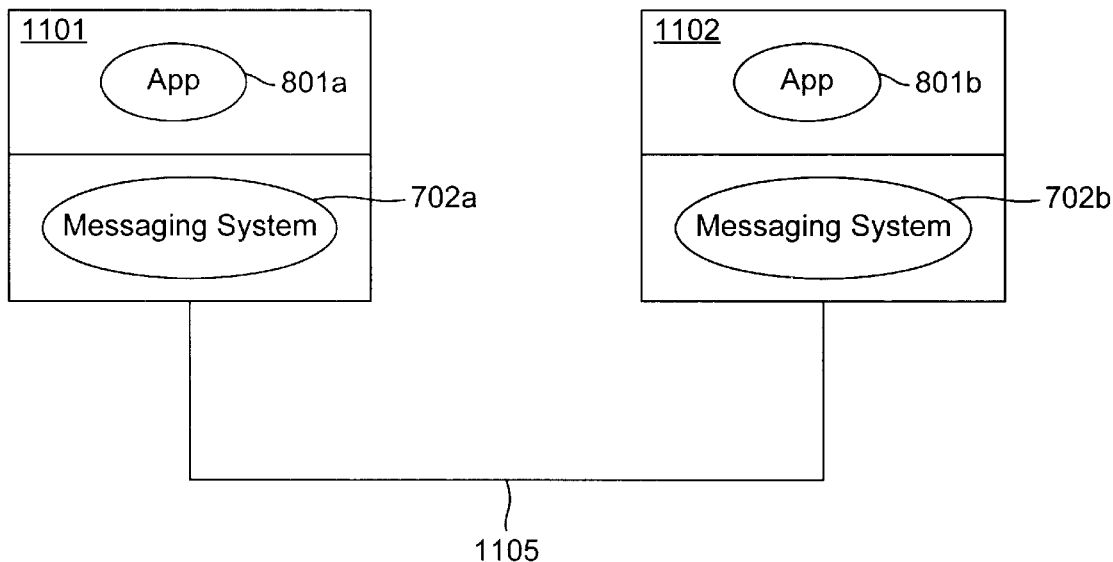
FIG. 11 shows a diagram of an application invoking another application in one embodiment of the HAVI architecture.

Referring now to FIG. 11, a diagram 1100 of an application invoking another application in one embodiment of the HAVI architecture is shown. Diagram 100 shows an application 801a running on a device 1101 passing a message 1105 to an application 801b running on a separate device 1102 via messaging systems 702a and 702b. As described above, any application running within the HAVI network can access any other application if it has a message handle for that application. To acquire a message handle, the same process is used as for a remote IAV device (e.g., described in FIG. 10 above). Once a message handle is available, the source application 801a can send a message 1105 to the target application 801b. As described above, the format of these messages is entirely dependent on the application and is of no concern to the CCEP architecture. It simply provides a communication mechanism to send a receive messages between the applications.

It should be appreciated that in the above example, it is assumed that the applications 801a and 801b reside on different AV devices 1101 and 1102. However, as discussed previously, it is quite possible that these applications 801a and 801b will reside on the same AV device and so the messaging system will perform a purely local communication call rather than a call that uses 1394 to transport the message.

Invoking a Software Service

A software service is a special case of the generic application case above. In accordance with the present invention, a software service is simply an application that is part of the system infrastructure. In this case, when a module wishes to invoke a system service, e.g. the UI component, it uses the messaging component to do this. If the UI component is local then the call is contained entirely within one AV device. However, if the UI component is remote, then the call will be routed over the 1394 network to the remote AV device, where the message system will dispatch the call to the UI system service.

Adding a New Device to a HAVI Network

In adding new devices to a HAVI network, there are 3 general situations: handling a legacy device using a legacy protocol carried over a non 1394 network; handling a base device using a non HAVI protocol over a 1394 network; and handling a new IAV device that is HAVI compliant.

In the case of adding a legacy device, in the present embodiment, a legacy device can only be directly controlled by an FAV node. As described above, for each legacy device, a legacy DCM must be created. Consider an FAV that has a 1394 port and an Ethernet port. The CMM module will have been configured to manage both 1394 and Ethernet. When the legacy device becomes know to the FAV, it will first become known at the CMM module. Note that the mechanism used to achieve this is not within the scope of the CCEP architecture. It is communications media specific. Once the CMM recognizes a new device, it will go through whatever media specific mechanism it uses to determine the type of the device. Again this is not part of the CCEP architecture. Eventually it will ask the DM to instantiate a legacy DCM for this device. It is assumed that the FAV node has been preconfigured with this DCM.

In the present embodiment, once the DCM is created, it registers itself in the same way as any standard DCM. However, one crucial difference between this DCM and other DCMs is that the communication model and the command set used to control the legacy device is completely unknown to the CCEP architecture. For example, it is possible that the device is an IP device that implements a printer service. In this case the DCM will provide a set of commands such as Print, Status etc. When an application calls the DCM API with a print request, the print command will be sent out by the DCM, via an IP stack, to the printer device. The actual details of how this happens are implementation specific.

In accordance with the present invention, one possibility is that the legacy DCM has a full implementation of the IP stack within the DCM and knows how to bind to the Ethernet device driver. Another possibility is that the FAV device provides an IP stack and a higher level API such as sockets. These are FAV implementation details and not part of the CCEP architecture. However, it should be noted that the legacy DCM is acting as a "proxy" DCM. Once it has been registered in the registry, it is visible to all other modules in the home network. They can all invoke its API and it performs the necessary conversion to the private command language of the Ethernet IP printer.

In the case of adding a base AV device, in the present embodiment, when the CMM is informed about the new device, its recognizes that this is not a CCEP node , but it also discovers that a DCM is available for this device. In this case, the CMM is responsible for implementing a mechanism that allows it to upload the DCM and to ask the DM to create this DCM. However, once the DCM is instantiated then it uses a purely private communication mechanism to access and control the device. As described above, in the present embodiment, a base AV device is one that uses 1394 and implements the over-ride DCM but does not implement any of the CCEP architecture and will no t implement level 1 HAVI commands. An example of this device could be one that contains an over-ride DCM but does not support the CCEP communications infrastructure.

In the case of adding an IAV device, it should be appreciated that in the previous examples, the application queried the registry to get a message handle for the device it wished to communicate with. Note that for a FAV device, the handle returned is always use d to access the DCM. It is not possible to send messages directly to the device. To understand how a device which is added to the network becomes available via the registry then the following example is used.

For example, assume a new device (e.g., a camcorder) is plugged into the HAVI network (e.g., 1394 based). This causes a bus reset. The bus reset is handled by the Communications media manager (CMM) on the IRD. The CMM is responsible for querying the SDD data of the Camcorder device to discover its capabilities. Assuming the device is a level 1 device, i.e. it does not have an uploadable DCM, then the CMM informs that Device Manager, that a new device has been installed. The Device Manager creates a new DCM for this type of device and registers the DCM with the registry. The DCM, when it initializes is free to query the device directly to find out more information about itself and to specialize itself if needed, e.g. it can access UI information if it exists in the device. Once the DCM is registered in the registry, then any other module can query the registry to get a handle for the device and communicate with the DCM to access and control the device and present the UI to the user.

Figure 12A:
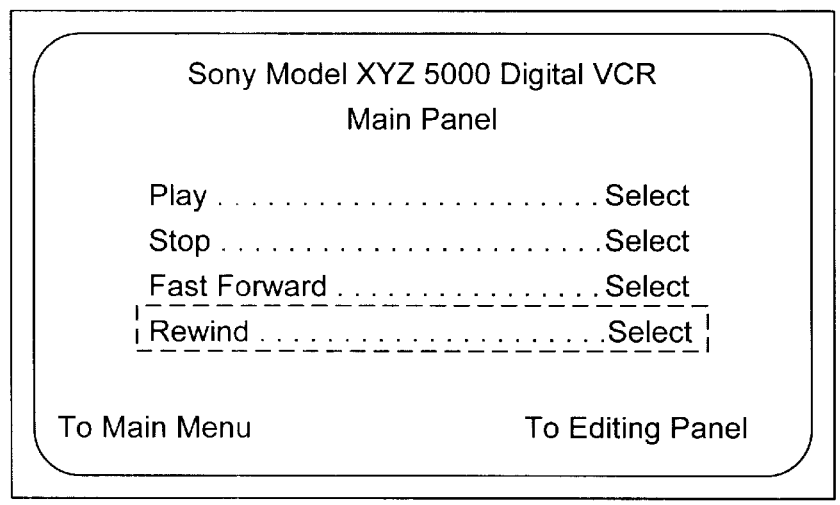
FIG. 12A shows a first exemplary UI display (e.g., on a television screen) for a device (e.g., the camcorder).
Figure 12B:
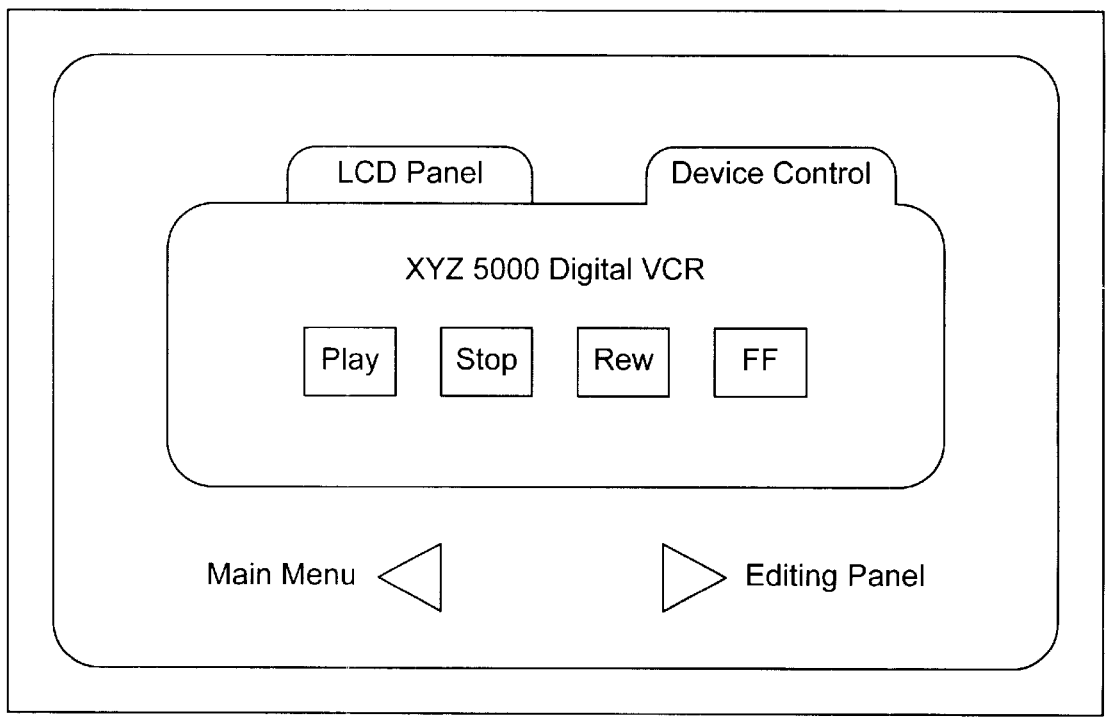
FIG. 12B shows a second exemplary UI display (e.g., on a television screen) for a device (e.g., the camcorder).

For example, FIG. 12A and 12 B show an exemplary UI display (e.g., on a television screen) for such a device(e.g., the camcorder). FIG. 12A shows a text menu display, where the user is presented with the various controls that can be modified using the control names and control values. For buttons, the user can select them (which equates to pushing a button). FIG. 12B shows a "next level" UI display for the camcorder. Here, the user selected the main panel from the menu in FIG. 12A, and the display presents controls based on their grouping information. In the present embodiment, group names are used on a tabbed interface to allow the user to navigate between groups within the selected panel.

Figure 13:
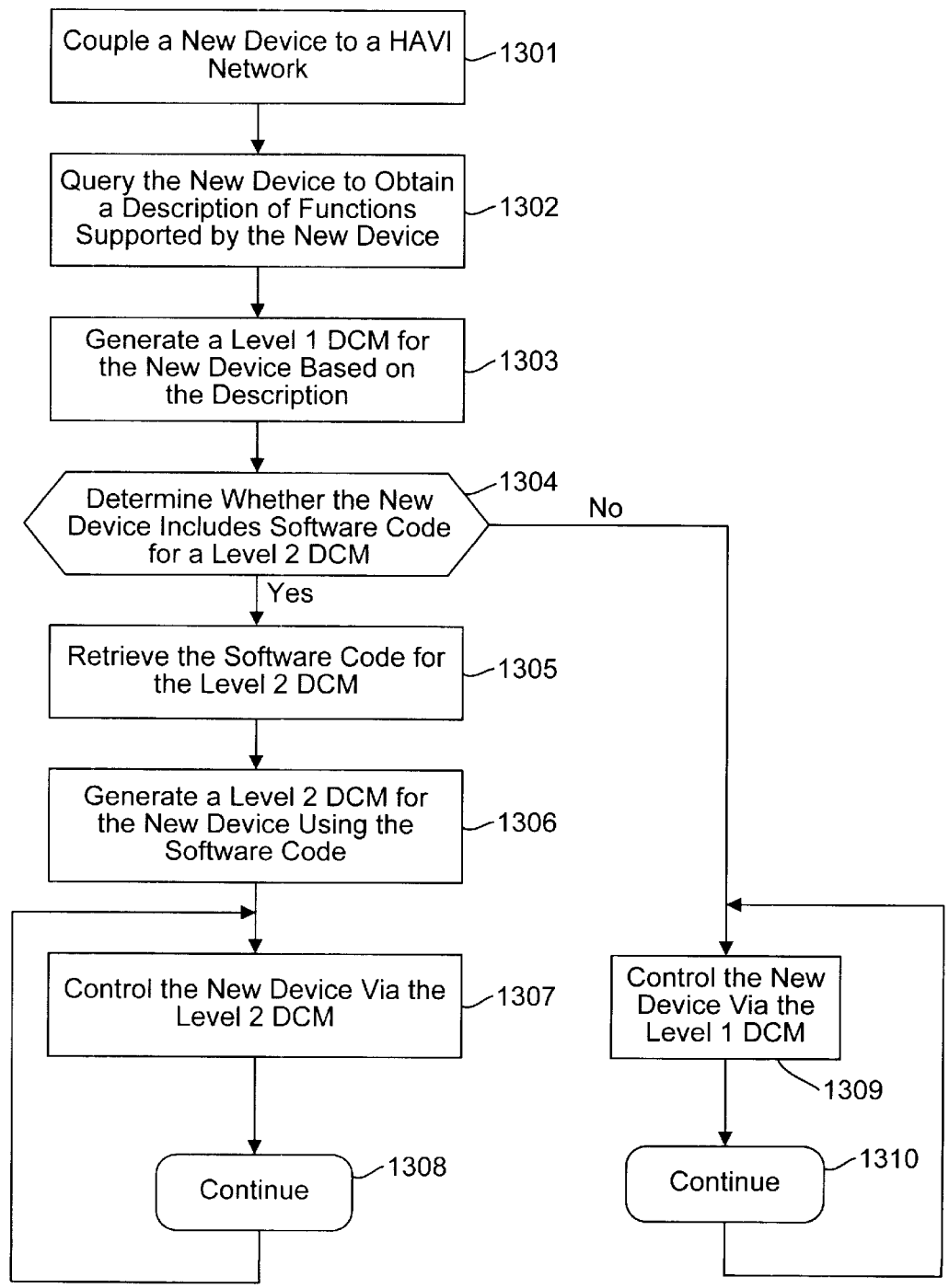
FIG. 13 shows a flow chart of a process for providing seamless interoperability and integration of a plurality of devices in a HAVI network by using the SDD information stored in each device in accordance with one embodiment of the present invention.

Referring now to FIG. 13, a flow chart of a process 1300 in accordance with one embodiment of the present invention is shown. Process 1300 shows the steps of a method for providing seamless interoperability and integration of a plurality of devices in a HAVI network by using the SDD information stored in each device. Process 1300 begins in step 1301, where a new device is coupled to a HAVI network. In step 1302, the device is queried to obtain a description (e.g., SDD) of level 1 functions supported by the device. In step, 1303, a level 1 DCM, which implements the level 1 functions, is generated for the device based upon the SDD. In step 1304, the device manager determines whether the new device contains software for a level 2 DCM.

Referring still to FIG. 13, in step 1305, if the new device contains software for implementing level 2 functions, the software is retrieved from the device and in step 1306, a level 2 DCM which implements the level 2 functions is generated using the software. In steps 1307 and 1308, the device is continually accessed via the level 2 DCM. In steps 1309 and 1310, if the new device does not include software for a level 2 DCM, the new device is continually accessed via the level 1 DCM. In this manner, the combination of the level 1 DCM and the level 2 DCM allow the present invention to provide seamless interoperability and integration of the new device with the plurality of devices in the network.

Figure 14:
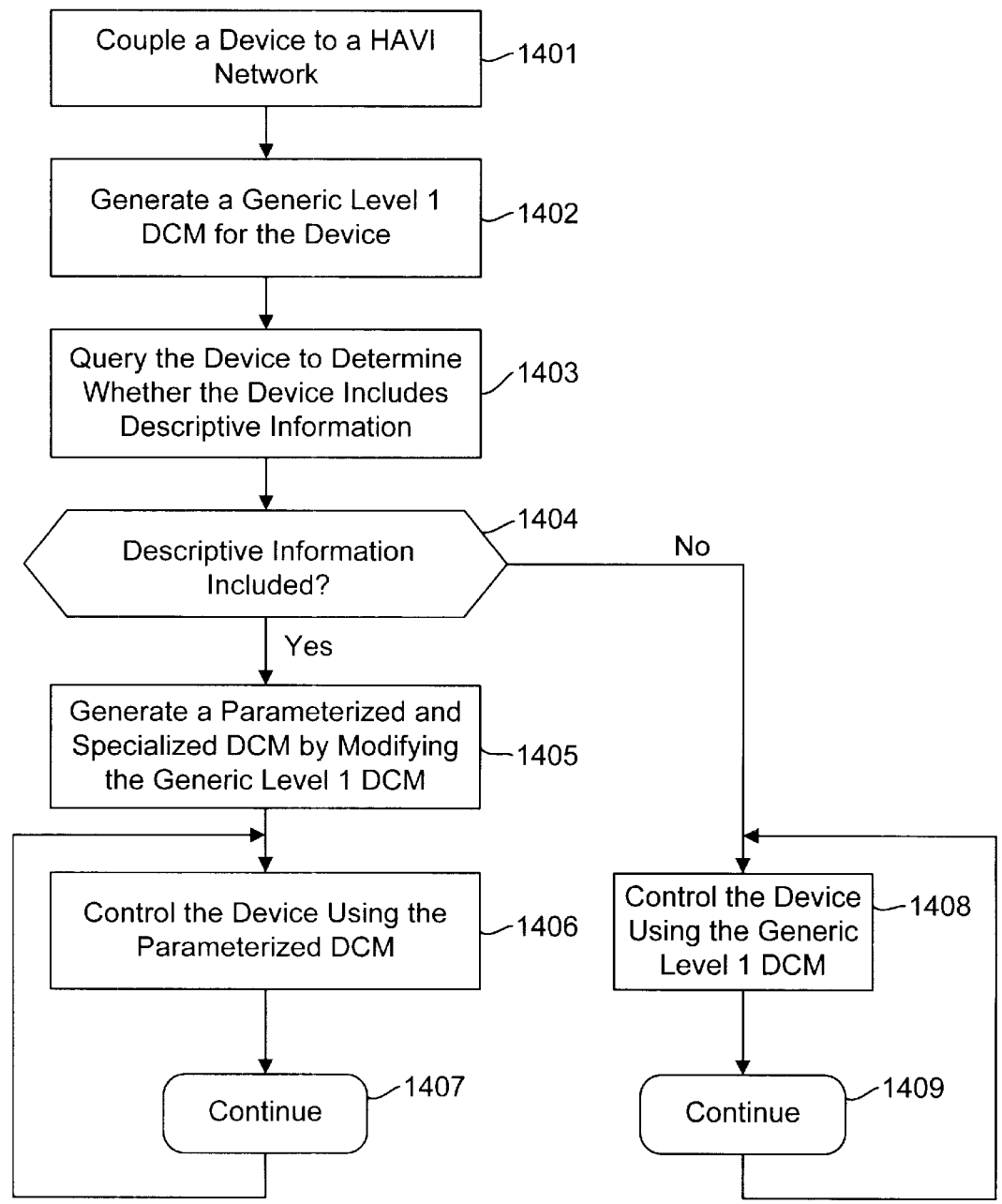
FIG. 14 shows a flow chart of a process for providing a basic command functionality and an expanded command functionality between a plurality of devices in a HAVI network in accordance with one embodiment of the present invention.

FIG. 14 shows a flow chart of a process 1400 in accordance with one embodiment of the present invention. Process 1400 shows the steps of a method for providing a basic command functionality and an expanded command functionality between a plurality of devices in a HAVI network. In step 1401, a device is coupled to a HAVI network which includes a FAV device. In step 1402, a generic level 1 DCM for the device is generated by the FAV device. As described above, the generic level 1 DCM is a basic abstraction of the capabilities of the device. The generic level 1 DCM enables the device to respond to a basic set of commands from the FAV device. In steps 1403 and 1404, the FAV device uses the generic DCM to query the device to determine whether the device includes descriptive information (e.g., SDD). As described above, the descriptive information describes the capabilities of the device. In step 1405, if the device includes descriptive information, the FAV device generates a parameterized DCM for the device by modifying the generic DCM based upon the descriptive information. In steps 1406 and 1407, the device is continually controlled using the parameterized level 1 DCM. In steps 1408 and 1409, if the device does not include descriptive information, the FAV device is continually controlled via the generic level 1 DCM.

Figure 15:
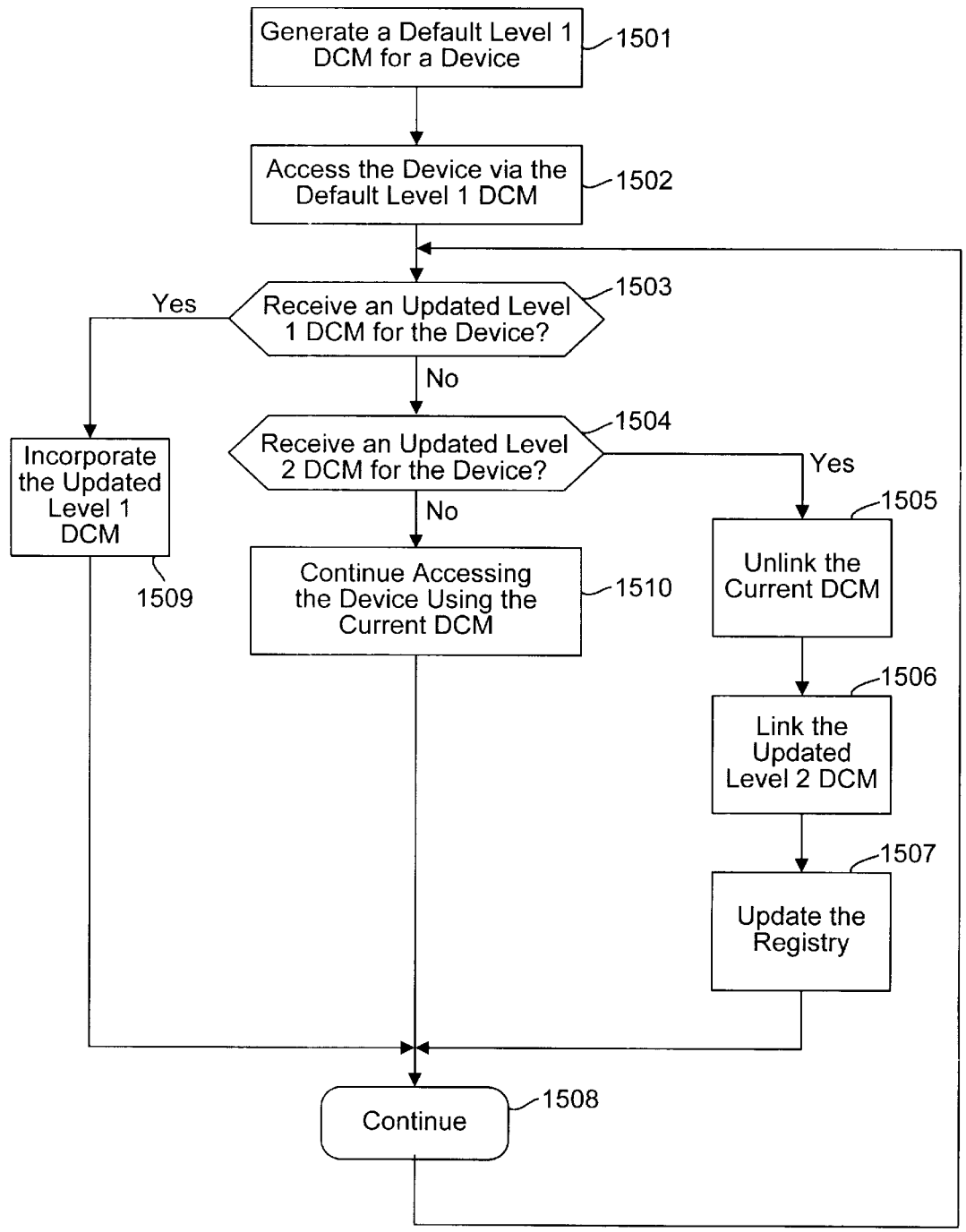
FIG. 15 shows a flow chart of a process for ensuring future upgradability and expandability of devices in HAVI network in accordance with one embodiment of the present invention.

Referring now to FIG. 15, a flow chart of a process 1500 in accordance with one embodiment of the present invention is shown. Process 1500 shows the steps of a method for ensuring future upgradability and expandability of devices in HAVI network. In step 1501, a default level 1 DCM for a device coupled to the network is generated. As described above, the default level 1 DCM is configured to ensure at least a minimum degree of interoperability between the device and the other devices on the HAVI network. In step 1502, the device is accessed by other devices via the default level 1 DCM. As described above, the default DCM enables the first device to respond to a default set of commands from other devices on the HAVI network In step 1503, an updated level 1 DCM for the devices is either received or not received. In step 1504, updated level 2 DCM for the device is either received or not received. As described above, the updates enable the device's capabilities and functionality to evolve (e.g., as new, more efficient software becomes available).

In steps 1509 and 1508, where an updated level 1 DCM is received, the updated level 1 DCM is incorporated (e.g., this could involve merely modifying the current level 1 DCM) and the device is continually accessed via this DCM until a later update is available. In step 1505, where an updated level 2 DCM is received, the DCM manager on the host FAV device unlinks the current DCM, and in steps 1506 and 1507, the updated level 2 DCM is linked and the registry is updated to allow other devices within the HAVI network to access the updated level 2 DCM. This DCM is continually used for accessing the device until a later updated level 2 DCM is received. In step 1510, if neither an updated level 1 or an updated level 2 DCM is received, process 1500 continues operation with the current DCM (e.g., the last installed DCM).

Figure 16:
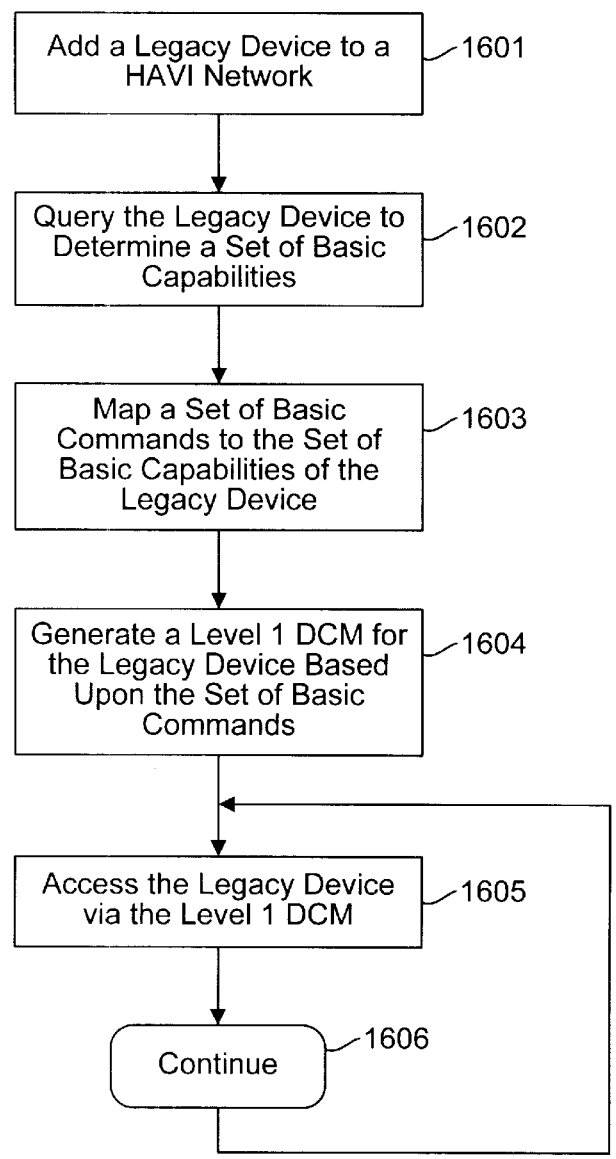
FIG. 16 shows a flow chart of a process for providing seamless interoperability and integration of legacy devices with the HAVI compliant devices in a HAVI network in accordance with one embodiment of the present invention.

FIG. 16 shows a flow chart of a process 1600 in accordance with one embodiment of the present invention. Process 1600 shows the steps of a method for providing seamless interoperability and integration of legacy devices with the HAVI compliant devices in a HAVI network. Process 1600 begins in step 1601, where a legacy device is coupled to the HAVI network. In step 1602, the legacy device is queried via the proprietary protocol to determine a set of basic capabilities of the legacy device. As described above, HAVI compliant devices use a common HAVI defined protocol. The legacy device typically communicates with external devices (if at all) using a proprietary protocol. In step 1603, process 1600 maps a set of basic commands from the common protocol to the set of basic capabilities of the legacy device. In step 1604, a level 1 DCM for the legacy device is generated. As described above, the DCM is based upon the set of basic commands. In steps 1605 and 1606, the legacy device is continually accessed via the level 1 DCM such that the other HAVI devices are able to access the set of basic capabilities of the legacy device.

Figure 17A:
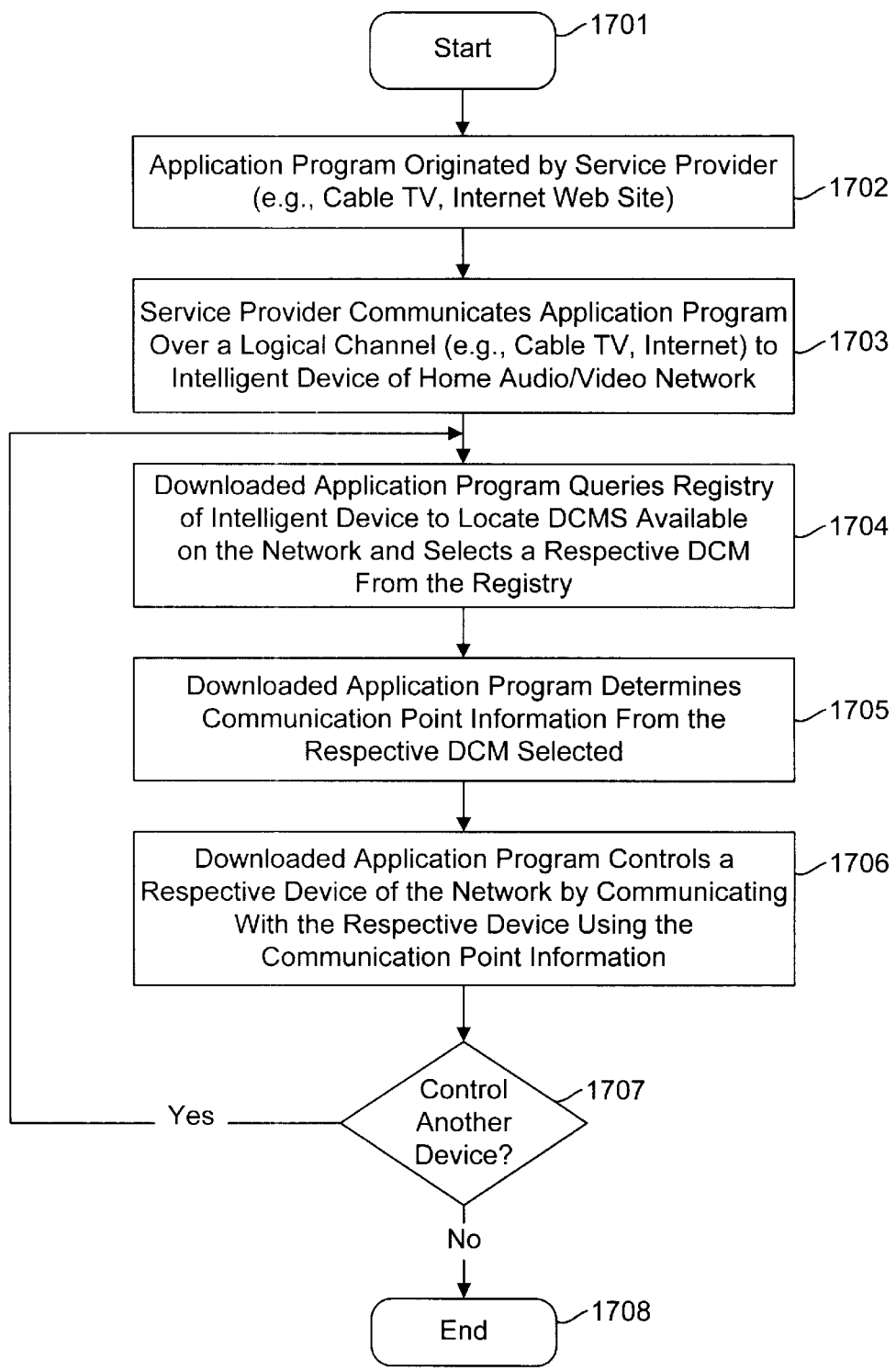
FIG. 17A shows a flow chart of a process for controlling devices within a home audio/video network using an application program from an external service provider accordance with one embodiment of the present invention.

FIG. 17A shows a flow chart of a process 1700 in accordance with one embodiment of the present invention. Process 1700 shows the steps of a method of controlling devices within a home audio/video network using an application program from an external service provider. In step 1702, an application program is originated by a service provider (e.g., via cable television, internet web site, etc.). In step 1703, the service provider communicates the application program from the service provider to an intelligent receiver/decoder device of the HAVI network over a logical channel. The application is subsequently instantiated within a computer readable memory unit of the intelligent receiver/decoder.

Referring still to FIG. 17A, in step 1704, the application program queries the HAVI registry of the device (e.g., FAV device) to locate DCMs on the network and selects a respective DCM from the registry. In step 1705, the down loaded application determines a communications point information from the selected DCM. In step 1706, the application controls a respective device of the HAVI network by communicating with the respective device using the communication point information. In step 1707, if the application needs to control another device, steps 1704 through 1706 are repeated. If the application does not need to control another device, processes 1700 ends in step 1708.

Figure 17B:
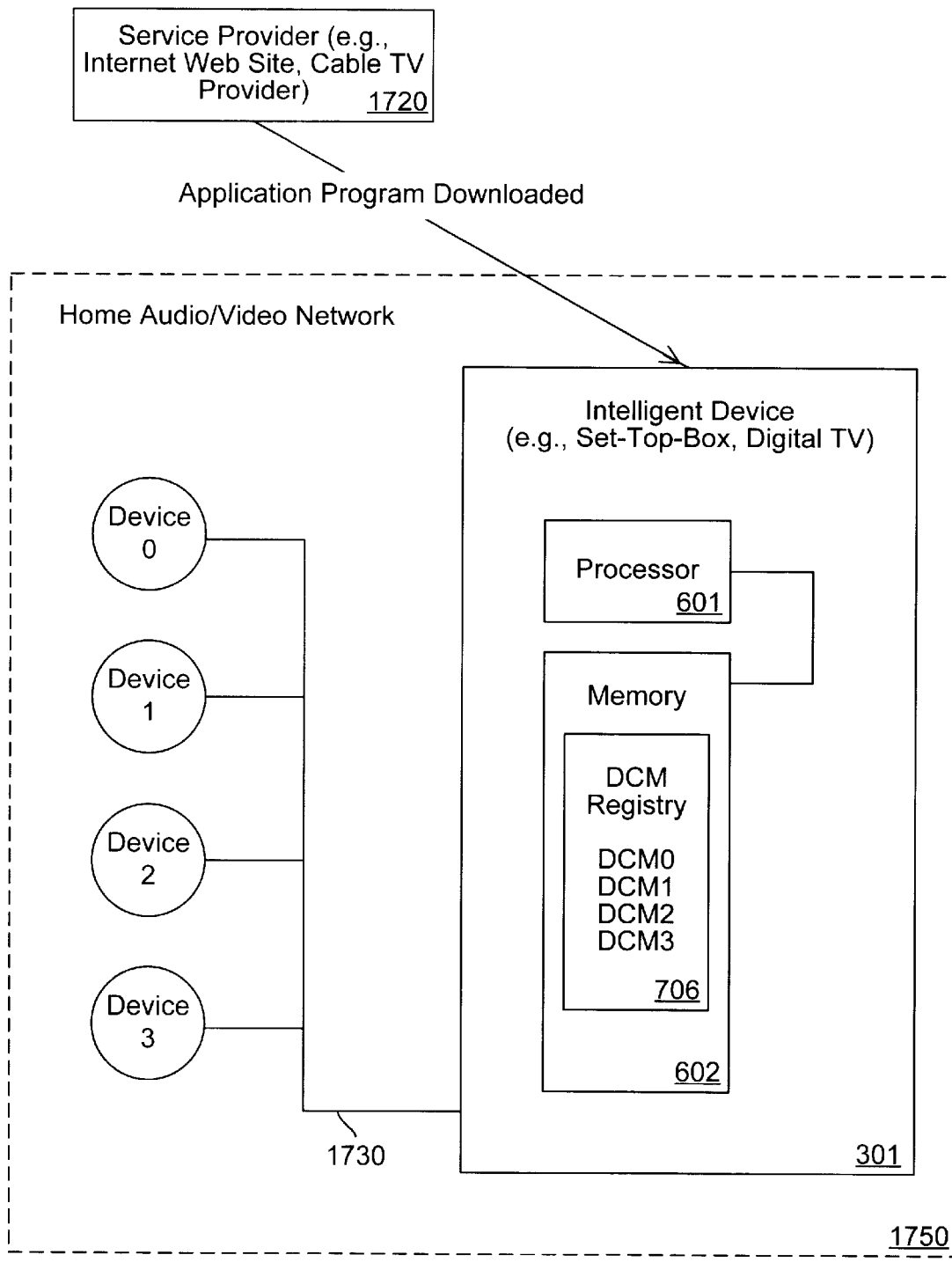
FIG. 17B shows a diagram of a HAVI network with the service provider in accordance with the process of FIG. 17A.

FIG. 17B shows a diagram of a HAVI network 1750 with the service provider 1720 in accordance with process 1700 of FIG. 17A. As described above, the application program is downloaded from the service provider 1720 to the HAVI network 1750. The application is instantiated on the processor 601 and memory 602 of the intelligent device (e.g., set top box 301). HAVI network 1750 also includes four HAVI devices, device 0 through device 3 (e.g., television, DVTR, etc.).

DCM MANAGEMENT API

An example DCM management API in accordance with one embodiment of the present invention is shown below. In the present embodiment, the common DCM commands include areas such as connection management, information and status queries for the device and its plugs etc. Regardless of the type of device represented by the DCM, such message sets need to be supported.

The following is a list of DCM management messages that, in the present embodiment, all DCM's need to support for the HAVI architecture:

ChannelUsage(plug); // returns the 1394 isoch. channel used by the specified unit plug
PlugUsage(channel); // returns the plug associated with the specified channel
GetDevicePlugCount(count); // returns the number of unit plugs on the device
EstablishInternalConnection(sourcePlug, destPlug);
EstablishExternalConnection(sourcePlug, destPlug)
StartDataFlow(plug);
StopDataFlow(plug);
GetSourceConnection(in dest, out source); // given a destination plug, return the source to which it is connected (return the source plug of the transmitting device which shares the same isoch. channel)
GetDestinationConnection(in source, out);
GetAllConnection( );
NotifyOnConnectionChange( );
GetDynamicConnectionCapability( ); // report whether the target device supports dynamic connection changes or not (e.g., a non-1394 device)
LockConnection(plug);
UnlockConnection(plug);
GetConnectionStatus(plug); // status=busy, data transmission format, channel, bandwidth usage, etc.
BreakInternalConnection(plug);
BreakExternalConnection(plug);
GetInputSignalFormat(plug);
setInputSignalFormat(plug);
NotifyInputSignalFormat(plug); // send a notification if the signal format is changed.
GetSupportedInputSignalFormats(plug); // repeat the above for output signals
GetFunctionInfo( ); // return information about the functional modules within the device (e.g., the AV/C subunits)
GetDeviceType( );
GetVendorName( );
GetVendorLogo( );
SetDevicePowerState(powerstate);
GetDevicePowerState(powerstate);
GetSupportedPowerStates(list);
NotiyPowerState(powerstate);
ReserveDevice( );
GetDeviceReservationStatus( );
NotifyDeviceReservationStatus( );
VendorDependentCommand(command parameters); // pass thru a vendor-specific command in the native protocol;
Function Control Module (FCM) Messages;

The function-specific messages correspond to the typical native commands such as PLAY, STOP, REWIND for the VCR functionality within a device. Because we need to address these messages to a well defined location within a device, we use the FCM (Function Control Module) to represent the target of these messages. Like DCM's, there are some messages that have to deal with administration and management of FCM's. These messages are supported by all FCM's, independent of their particular domain. The messages are as follows:

GetFunctionType( ); // VCR, tuner, disc, etc.
GetFunctionInfo( ); // more detailed information about the function, such as the particular kind of disc player (DVD, CD, etc.)
GetNumberOfPlugs(inputPlugs outputPlugs); // returns the number of source and destination plugs for the functional module
GetFunctionStatus( ); // current status of the functional module, including the status of source and destination plugs (input and output)
GetPowerState(powerState); // functional modules may have individually controllable power states
SetPowerState(powerState);
GetSupportedPowerStates(list);
GetSupportedDataFormats(list); // returns the data formats supported by this functional module
NativeCommand(params); // send the functional module a command in its native command protocol The functional domain messages are based on the type of function (VCR, tuner, etc.). These are the typical PLAY, STOP, REWIND commands that one would expect.

Level I interoperability includes both device-to-device and human-to-device interaction. The functional message sets such as PLAY, STOP and REWIND are used for device-to-device interaction. One example of this would be a video editing software package that wants to control any type of VCR; the program is designed with a very specific set of user interface controls which apply to all VCR's. When the user interacts with the application, the application in turn sends domain-specific commands such as PLAY and STOP to the target device.

In the HAVI architecture, the application will send these messages to the DCM, and the DCM will translate them into the native language of the target BAV device. If the target device happens to support the HAVI messaging architecture, then these commands don't need to be translated at all; they are simply sent as HAVI message to the HAVI target.

Camcorder devices are essentially VCR like. Their additional functionality is part of the camcorder effects, transitions, etc. They are as follows:

stop( )
play( )
rewind( )
forward( )
record( )
volume(setvalue)
changeStatus(newMode) // newMode of: VTR, CAMERA, STANDBY cameraControl(controlType) // controlTYPE defines control Type and subType structures eg zoom, zoomValue, or Effect, transition5 etc.

MiniDiscs are of the category random access storage, they support a base set of commands to control PLAY, FORWARD, etc and a set of command specific to random access media. The commands are as follows:

stop( )
play( )
rewind( )
forward( )
record( )
volume(setValue)
changeStatus(newMode) // newMode of: STANDBY
seek(track)
seekstart( )
seekEnd( )
getDiskInfo( )
mdControl(controlType) // controlTYPE defines control Type and subType structures eg intro mode, random play.

Hard Disks are of the category random access storage, they support a base set of commands to control PLAY, FORWARD, etc and a set of command specific to random access media. The commands are as follows:

stop( )
play( )
rewind( )
forward( )
record(type) // type structure passes info to allow intelligent devices to
optimise storage policy changestatus(newMode) // newMode of: STANDBY
seek(track)
seek(block)
seekStart( )
seekEnd( )
HDDControl(controlType) // controlTYPE defines control Type and subType structures eg layout commands for block-structures With respect to user interfaces, it should be appreciated that a generic and simple UI may be a textual based one, as shown in FIG. 12A. A more sophisticated one, based on DCM specialization, may be as shown on FIG. 12B. Where graphical information, carried in SDD is used by the generic DCM to specialize itself.

Hence, the present invention provides a home audio visual (AV) network which defines an open architecture for inter-operating CE (consumer electronic) devices in a home network. The interoperability aspects of the present invention define an architectural model that allows CE devices from any manufacturer to inter-operate and function seamlessly within the user's home AV system. The system of the present invention includes a combination of a base set of generic device controls with an method to extend a base control protocol as new features and new CE devices are deployed within the home AV network. In so doing, the architecture of the present invention is extensible, and can be readily modified and advanced as market requirements and technology change.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A method for providing a basic command set and an expanded command set between a plurality of devices in a network, the method comprising the steps of:

a) coupling a first device to the network, the network having a second device;

b) generating a generic control module for the first device by using the second device, wherein the generic control module enables the first device to respond to a basic set of commands from the second device;

c) obtaining descriptive information regarding the first device, wherein the descriptive information is stored in the first device;

d) generating a parameterized control module for the first device by modifying the generic control module based upon the descriptive information, the step d) performed by the second device; and e) accessing the first device by the second device via the parameterized control module wherein the parameterized control module enables the first device to respond to an expanded set of commands from the second device.

2. The method of claim 1 wherein the parameterized control module enables the second device to present specialized information regarding the first device to a user via a user interface.

3. The method of claim 1 wherein the descriptive information is used by the second device to augment an application programming interface (API) for the first device.

4. The method of claim 1 wherein the descriptive information is used by the second device to augment a device abstraction of the first device.

5. The method of claim 1 wherein steps b) through d) are performed by a device manager instantiated on the second device.

6. The method of claim 1 wherein the generic control module and the parameterized control module are both instantiated on the second device.

7. The method of claim 1 wherein the first device is accessed by one of the plurality of devices in the network by accessing the generic control module or the parameterized control module, depending upon the capabilities of the first device.

8. The method of claim 1 wherein the network is an IEEE 1394 based network and the generic control module and the parameterized control module are configured to function in accordance with IEEE 1394 serial communication.

9. A home audio video network including a plurality of devices coupled to a bus, wherein at least one of the devices is a host device having a processor coupled to a computer readable memory, the memory containing computer readable instructions which when executed implement a method for providing a basic command set and an expanded command set between the plurality of devices, the method comprising the steps of:

a) coupling a new device to a network which includes a plurality of devices;

b) generating a generic control module for the new device, wherein the generic control module enables the new device to respond to a basic set of commands;

c) obtaining descriptive information regarding the new device, wherein the information is stored in the new device;

d) generating a parameterized control module for the new device by modifying the generic control module based upon the descriptive information; and e) accessing the new device via the parameterized control module wherein the parameterized control module enables the new device to respond to an expanded set of commands.

10. The home audio video network of claim 9 wherein the method further comprises the step of presenting specialized information regarding the new device to a user via a user interface by using the parameterized control module.

11. The home audio video network of claim 9 wherein the method further comprises the step of augmenting an application programming interface for the new device by using the descriptive information.

12. The home audio video network of claim 9 wherein the method further comprises the step of augmenting a device abstraction of the new device by using the descriptive information.

13. The home audio video network of claim 9 wherein the generic control module and the parameterized control module are both instantiated on the host device of the plurality of devices included in the home audio video network.

14. The home audio video network of claim 9 wherein the new device is accessed by one of the plurality of devices by accessing the generic control module or the parameterized control module, depending upon the capabilities of the new device.

15. The home audio video network of claim 9 wherein the bus of the home audio video network is of the IEEE 1394 serial communication bus standard and the generic control module and the parameterized control module are configured to function in accordance with IEEE 1394 serial communication.

16. The home audio video network of claim 9 wherein the generic control module and the parameterized control module both provide control interfaces which provide a predefined set of control interfaces for the new device which enable integration of the new device with the plurality of devices in the network.

17. A system including a plurality of devices of a home audio video network, the plurality of devices coupled to a bus, wherein one of the devices is a host device including a processor coupled to a computer readable memory, the memory containing computer readable instructions which when executed implement a method of providing a basic command set and an expanded command set between the plurality of devices, the method comprising the steps of:

a) coupling a new device to the network;

b) generating a generic control module for the new device, wherein the generic control module enables the new device to respond to a basic set of commands;

c) obtaining descriptive information regarding the new device, wherein the information is stored in the new device;

d) generating a parameterized control module for the new device by modifying the generic control module based upon the descriptive information; and e) accessing the new device via the parameterized control module wherein the parameterized control module enables the new device to respond to an expanded set of commands;

f) presenting specialized information regarding the new device to a user via a user interface by using the parameterized control module; and g) augmenting an application programming interface (API) for the new device by using the descriptive information.

18. The system of claim 17 wherein the new device is accessed by one of the plurality of devices by accessing the generic control module or the parameterized control module, depending upon the capabilities of the new device.

19. The system of claim 17 wherein the bus of the home audio video network is of the IEEE 1394 standard and the generic control module and the parameterized control module are configured to function in accordance with IEEE 1394.

20. The system of claim 17 wherein the generic control module and the parameterized control module both provide control interfaces which enable the integration of the new device with the plurality of devices in the network.

21. The system of claim 17 wherein the control interfaces provide interoperability and functionality interfaces for the new device.

22. A apparatus for providing a basic command set and an expanded command set between a plurality of devices in a network, comprising:

a) means for coupling a first device to the network, the network having a second device;

b) means for generating a generic control module for the first device by using the second device, wherein the generic control module enables the first device to respond to a basic set of commands from the second device;

c) means for obtaining descriptive information regarding the first device, wherein the descriptive information is stored in the first device;

d) means for generating a parameterized control module for the first device by modifying the generic control module based upon the descriptive information, the step d) performed by the second device; and e) means for accessing the first device by the second device via the parameterized control module wherein the parameterized control module enables the first device to respond to an expanded set of commands from the second device.

* * * * *